Dec. 5, 1967 W. R. SMITH-VANIZ ETAL 3,357,002

MAGNETIC TAPE INFORMATION STORAGE AND RETRIEVAL SYSTEM

Filed March 18, 1964 9 Sheets-Sheet 1

INVENTOR
William Reid Smith-Vaniz
BY Harvey R. Sherman

Blair & Buckles
ATTORNEYS

MAGNETIC TAPE INFORMATION STORAGE AND RETRIEVAL SYSTEM

Filed March 18, 1964

INVENTOR.
William Reid Smith-Vaniz
Harvey R. Sherman
BY
Blair & Buckles
ATTORNEYS.

INVENTOR.
William Reid Smith-Vaniz
BY Harvey R. Sherman

Blair & Buckles
ATTORNEYS

INVENTOR.
William Reid Smith-Vaniz
Harvey R. Sherman
BY
Blair & Buckles
ATTORNEYS.

INVENTOR.
William Reid Smith-Vaniz
BY Harvey R. Sherman

Blair & Buckles
ATTORNEYS.

INVENTOR.
William Reid Smith-Vaniz
Harvey R. Sherman
BY
Blair & Buckles
ATTORNEYS.

INVENTOR.
William Reid Smith-Vaniz
Harvey R. Sherman
BY
Blair & Buckles
ATTORNEYS

MAGNETIC TAPE INFORMATION STORAGE AND RETRIEVAL SYSTEM

Filed March 18, 1964 9 Sheets-Sheet 8

INVENTOR.
William Reid Smith-Vaniz
BY Harvey R. Sherman

Blair & Buckles
ATTORNEYS.

| | P | H | G | F | E | D | I | Q | N | O | $\bar{N}$ | $\bar{O}$ |
|---|---|---|---|---|---|---|---|---|---|---|---|---|
| STROBE (S) | 0 | 0 | 0 | 0 | 0 | 0 | 0 | 0 | 1 | 1 | 0 | 0 |
| READ | 0 | $Ø_H$ | $Ø_G$ | $Ø_F$ | $Ø_E$ | $Ø_D$ | 1 | 0 | 1 | 1 | 0 | 1 |
| SHIFT (1) | 1 | 0 | $Ø_H$ | $Ø_G$ | $Ø_F$ | $Ø_E$ | $Ø_D$ | 1 | 1 | 0 | 0 | 1 |
| " (2) | 1 | 1 | 0 | $Ø_H$ | $Ø_G$ | $Ø_F$ | $Ø_E$ | $Ø_D$ | 1 | 0 | 0 | 1 |
| " (3) | 1 | 1 | 1 | 0 | $Ø_H$ | $Ø_G$ | $Ø_F$ | $Ø_E$ | 1 | 0 | 0 | 1 |
| " (4) | 1 | 1 | 1 | 1 | 0 | $Ø_H$ | $Ø_G$ | $Ø_F$ | 1 | 0 | 0 | 1 |
| " (5) | 1 | 1 | 1 | 1 | 1 | 0 | $Ø_H$ | $Ø_G$ | 1 | 0 | 0 | 1 |
| " (6) | 1 | 1 | 1 | 1 | 1 | 1 | 0 | $Ø_H$ | 1 | 0 | 0 | 1 |
| " (7) | 1 | 1 | 1 | 1 | 1 | 1 | 1 | 0 | 1 | 0 | 0 | 1 |
| STROBE (S) | 0 | 0 | 0 | 0 | 0 | 0 | 0 | 0 | 1 | 1 | 0 | 0 |

INVENTOR.
William Reid Smith-Vaniz
Harvey R. Sherman
BY
Blair & Buckles
ATTORNEYS United States Patent Office
3,357,002
Patented Dec. 5, 1967

3,357,002
MAGNETIC TAPE INFORMATION STORAGE AND RETRIEVAL SYSTEM

William Reid Smith-Vaniz, Darien, and Harvey R. Sherman, Stamford, Conn., assignors to Whitek, Inc., a corporation of Connecticut Filed Mar. 18, 1964, Ser. No. 352,918
10 Claims. (Cl. 340—174.1)

INTRODUCTION

The present invention relates to information storage and retrieval systems. More particularly, it relates to digital equipment using an indexed recording tape as the information storage medium.

Specifically, the invention provides a unique magnetic tape handling unit capable of recording randomly received characters at uniformly spaced, precisely located, positions on an indexed magnetic tape. The unit is also capable of reading each character, so recorded on an indexed magnetic tape, upon randomly occurring output requests. The invention further provides a system of two such magnetic tape handling units and a continuous sprocketed magnetic tape; one unit operating in a recording mode, the other operating in a read mode, and each controlled by novel control circuitry to provide for temporary character storage. Such a system is known in the information handling art as a buffer storage system.

PRIOR ART AND PROBLEMS

Punched tape currently enjoys wide use as a character storage medium in data processing applications. For example, it has been used for many years for temporary storage of telegraph and teletype messages at message relay centers. More recently it has come into wide use for recording slowly transmitted or randomly occurring messages which then are rapidly read into a high speed digital computer.

Paper tape punches and readers are useful in such "buffer storage" applications because they are capable of recording and reading each character on the tape on demand at random times, or continuously at varying rates of speed. Thus, characters recorded at one rate may be reproduced at another, and characters recorded at random times, so-called "asynchronous recording" may be reproduced at a uniform "synchronous" rate, and vice versa.

Moreover, a punched tape buffer storage system has, theoretically, an unlimited storage capacity and the tape itself, being perforated, can be read visually as well as mechanically.

However, punched tape systems suffer from many disadvantages. The low operating speeds of mechanical punches and readers limit the rate at which characters can be reliably recorded or read and, thus, the operating rate of communication systems with which the punched tape buffer storage system is associated. The recording density is low for ease of synchronization, but as a result, the amount of paper tape necessary to store lengthy messages becomes large. Most tape punches, punch complete holes and the disposal of the resulting "chad" is not an insignificant problem. Moreover, punched tape is not reusable. Punched tape systems are relatively expensive and rather inflexible in operation. Constant maintenance is required in replacing worn parts and to prevent jamming of the paper punches. Reliability suffers because of the large number of moving parts.

Prior art magnetic tape units are capable of recording characters at one rate and reproducing them at another; and, when used with additional expensive electric buffer storage systems, may record characters received at times slightly varying from those predetermined by an average rate. However, prior art magnetic tape units are incapable of recording single characters arriving at random times so that they may be reproduced synchronously and are incapable of reading characters at random times on demand. On the other hand, magnetic tape units are capable of recording and reproducing synchronously at very high character rates of the order of 500 characters per second and more, whereas paper tape punches are practically limited to recording up to 100 characters per second. Certain photoelectric tape readers can read punched tape at rates as high as 300 characters per second.

OBJECTS OF THE INVENTION

It is accordingly an object of the present invention to provide an electronic information storage and retrieval system particularly adapted to supplant punched tape systems.

Another object of the invention is to provide a recorder-reproducer capable of recording or reproducing "asynchronous" information characters at random times.

A further object of the invention is to provide a recorder-reproducer of the above character capable of recording and reproducing information characters at different character rates.

Another object of the invention is to provide a recorder-reproducer of the above character capable of recording characters asynchronously and reproducing them synchronously and vice versa.

Yet another object of the invention is to provide a recorder-reproducer of the above character capable of recording characters at higher maximum rates than is practicable using punched tape.

A still further object is to provide a recorder-reproducer of the above character which is extremely flexible and reliable in operation, inexpensive, uses solid state circuitry and requires little or no maintenance.

An additional object is to provide an asynchronous tape recorder-reproducer of the above character achieving higher recording densities than punched tape systems.

A further object of the invention is to provide a recorder-reproducer of the above character capable of receiving for recording or reproducing the binary information units of binary coded characters simultaneously or sequentially.

Another object of the invention is to provide a buffer storage system utilizing recorder-reproducers of the above character.

Still another object of the invention is to provide recorder-reproducers and buffer storage systems of the above character utilizing magnetic tape as a recording medium.

An additional object of the invention is to provide a novel regulated energizing circuit for an electrical stepping motor. A related object of the invention is to provide such an energizing circuit having particular application in an asynchronous tape recorder-reproducer of the above character.

A further object of the invention is to provide a novel pulse generator whose output pulse duration is compressed at high triggering rates. A related object of the invention is to provide such a pulse generator having particular application in an asynchronous tape recorder-reproducer of the above character.

Other objects of the invention will in part be obvious and will in part appear hereinafter.

The invention accordingly comprises the means and features of operation and combinations of functions, and the relation of one or more of such operations and functions with respect to each of the others of the system; and apparatus embodying features of construction, combinations of elements and arrangements of parts which are adapted to effect such operations and functions, all as exemplified in the following detailed disclosure.

The scope of the invention will be indicated in the claims.

For a fuller understanding of the nature and objects of the invention, reference should be had to the following detailed description taken in connection with the accompanying drawings in which:

FIGURE 1*a* is an overall block diagram of the preferred embodiment of an asynchronous magnetic tape recorder-reproducer according to the present invention;

FIGURE 1*b* is an enlarged perspective view of the sprocketed magnetic tape and tape head of FIGURE 1*a*;

Figure 2:
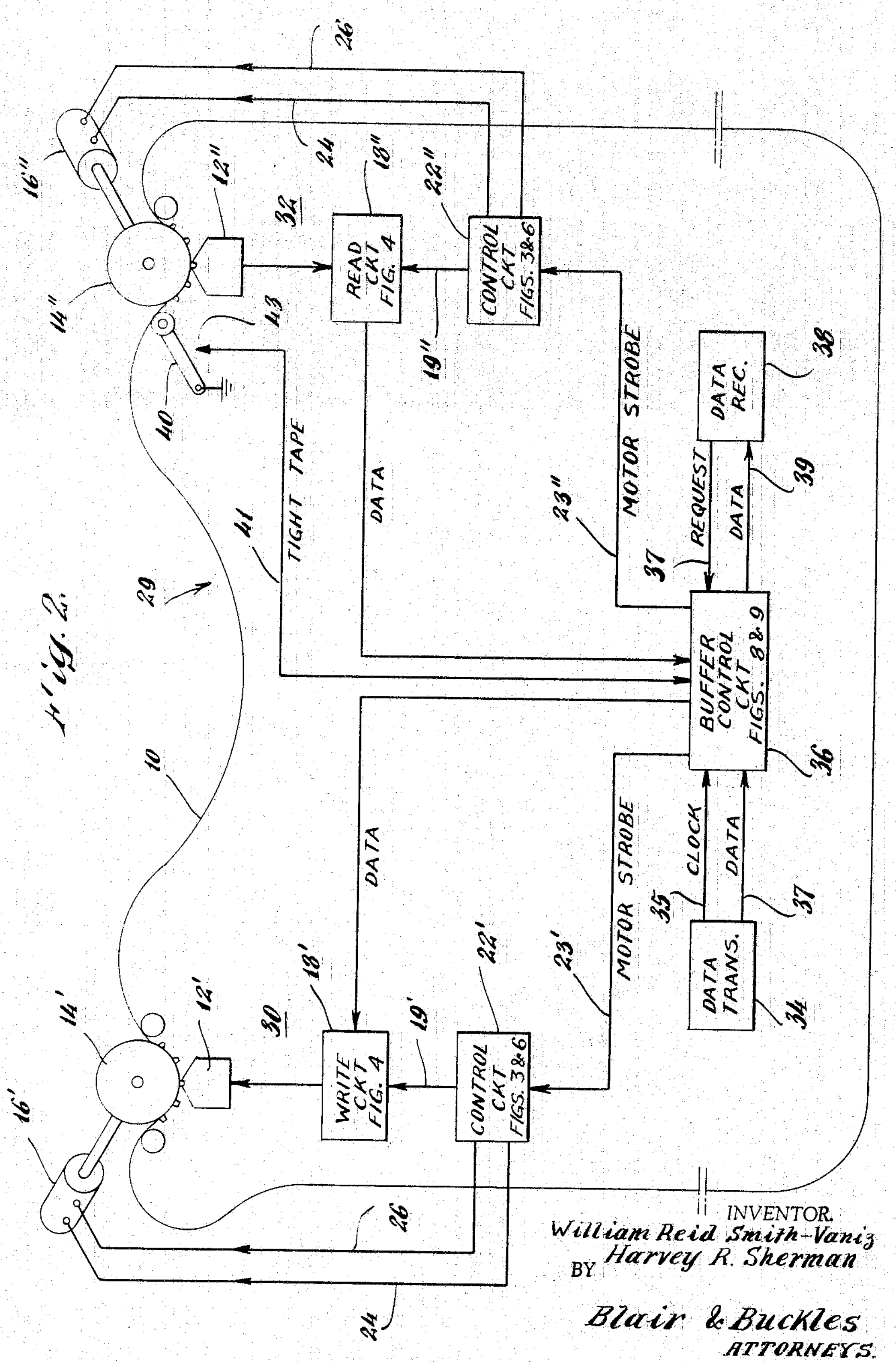
FIGURE 2 is an overall block diagram of the preferred embodiment of a magnetic tape buffer storage system according to the present invention utilizing two of the recorder-reproducers of FIGURE 1*a*.
Figure 3:
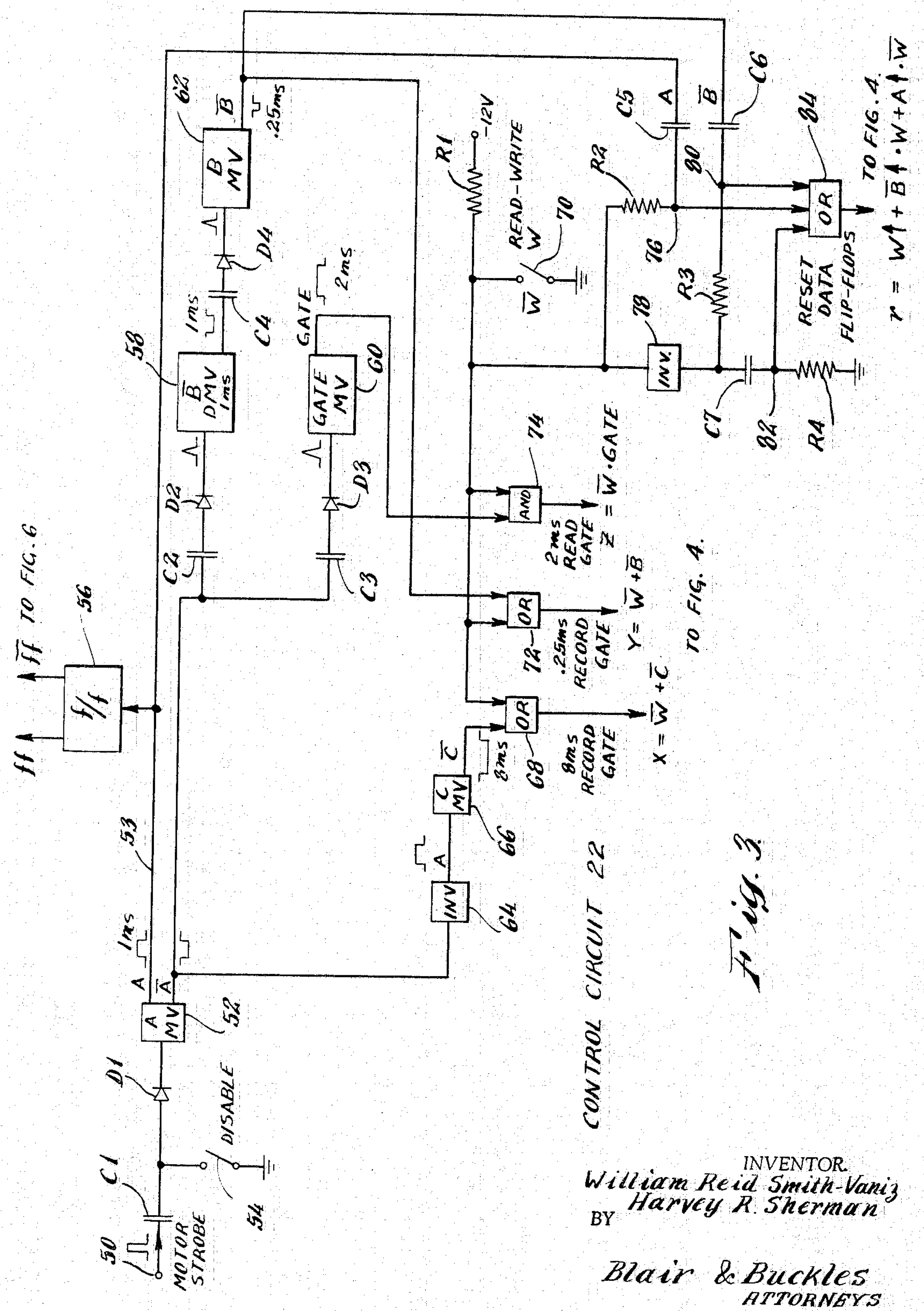
FIGURE 3 is a logic block diagram, partially in schematic form, of a portion of the control circuit of FIGURE 1*a*.
Figure 7B:
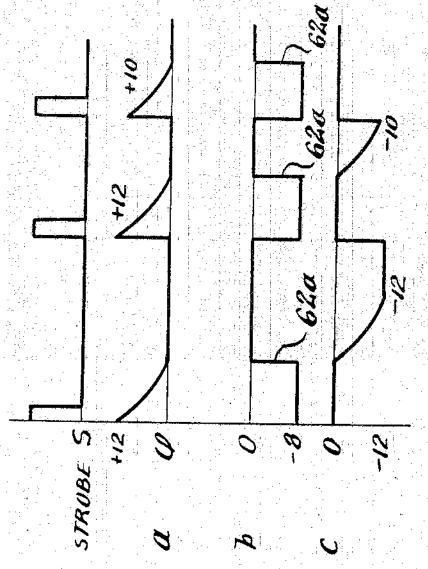
Figure 7A:
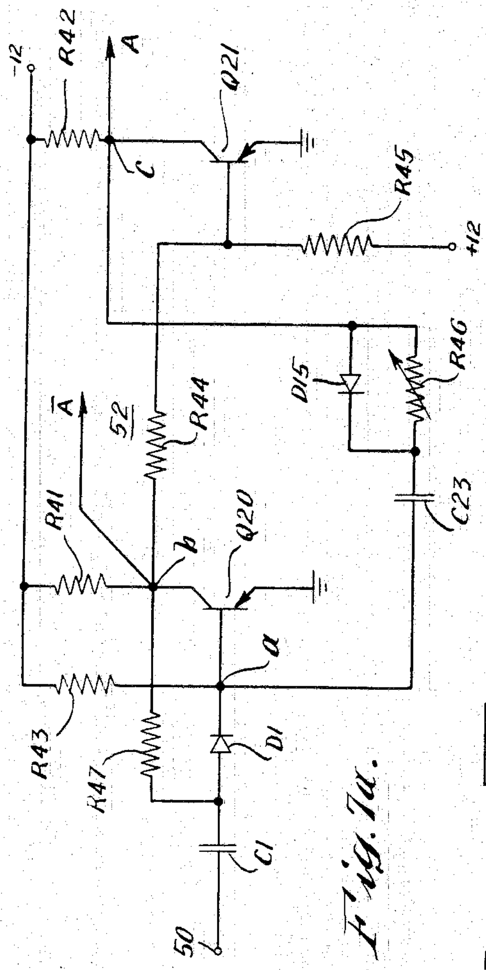
Figure 12:
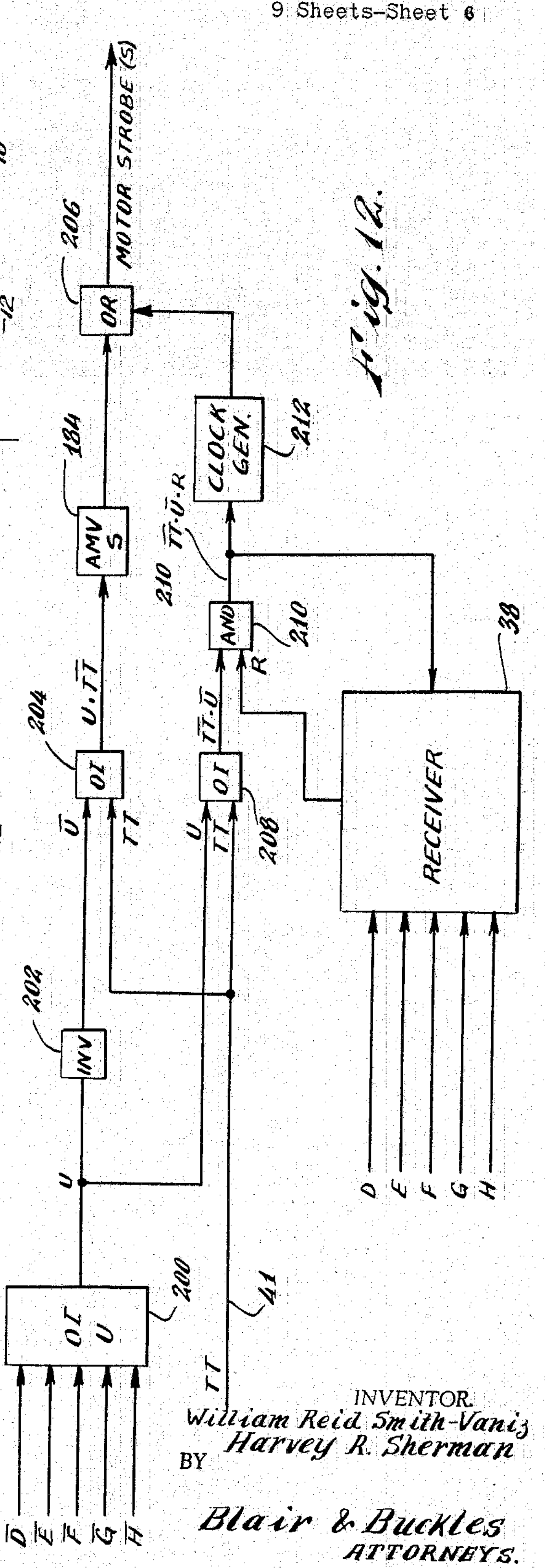
Figure 8:
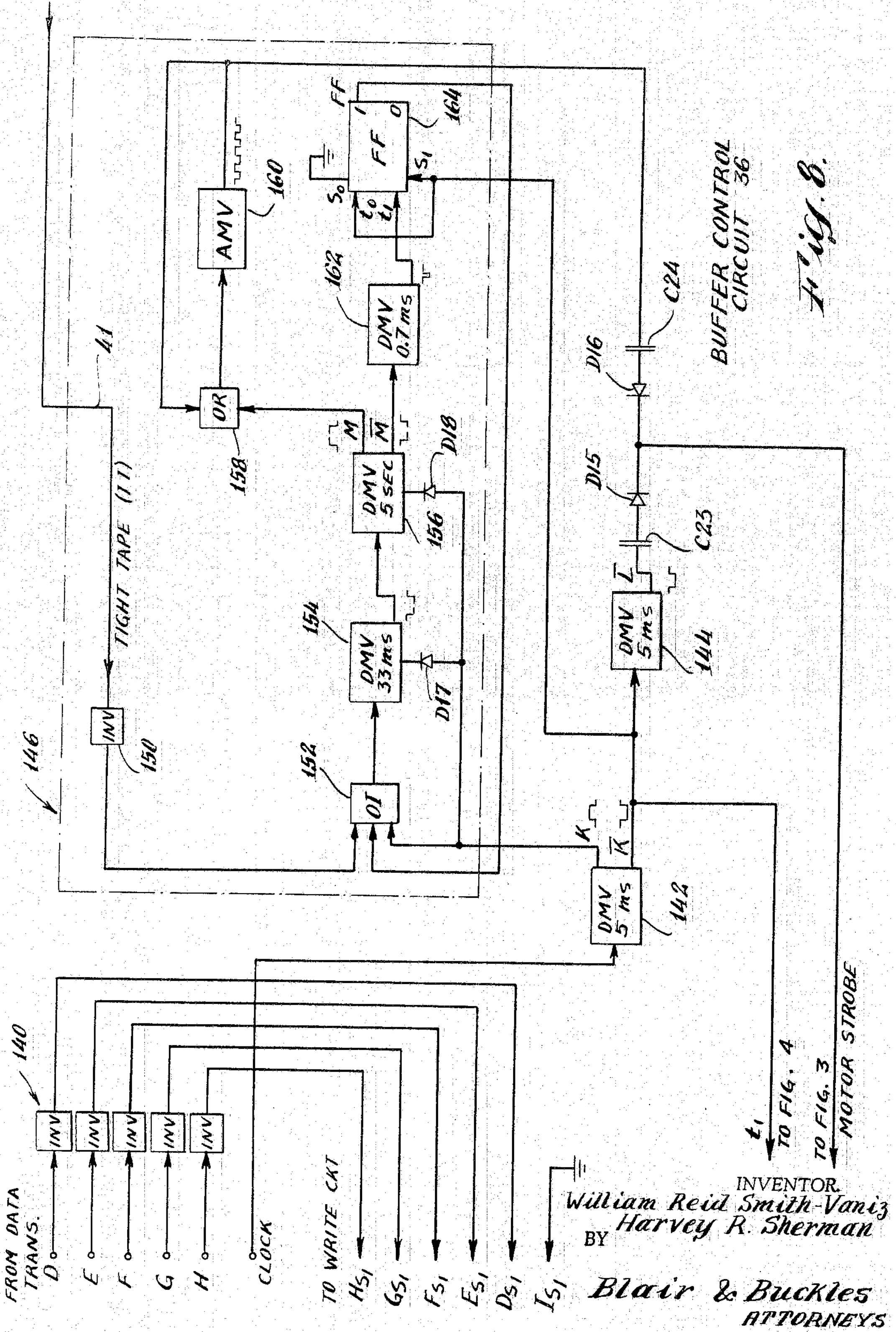
Figure 9:
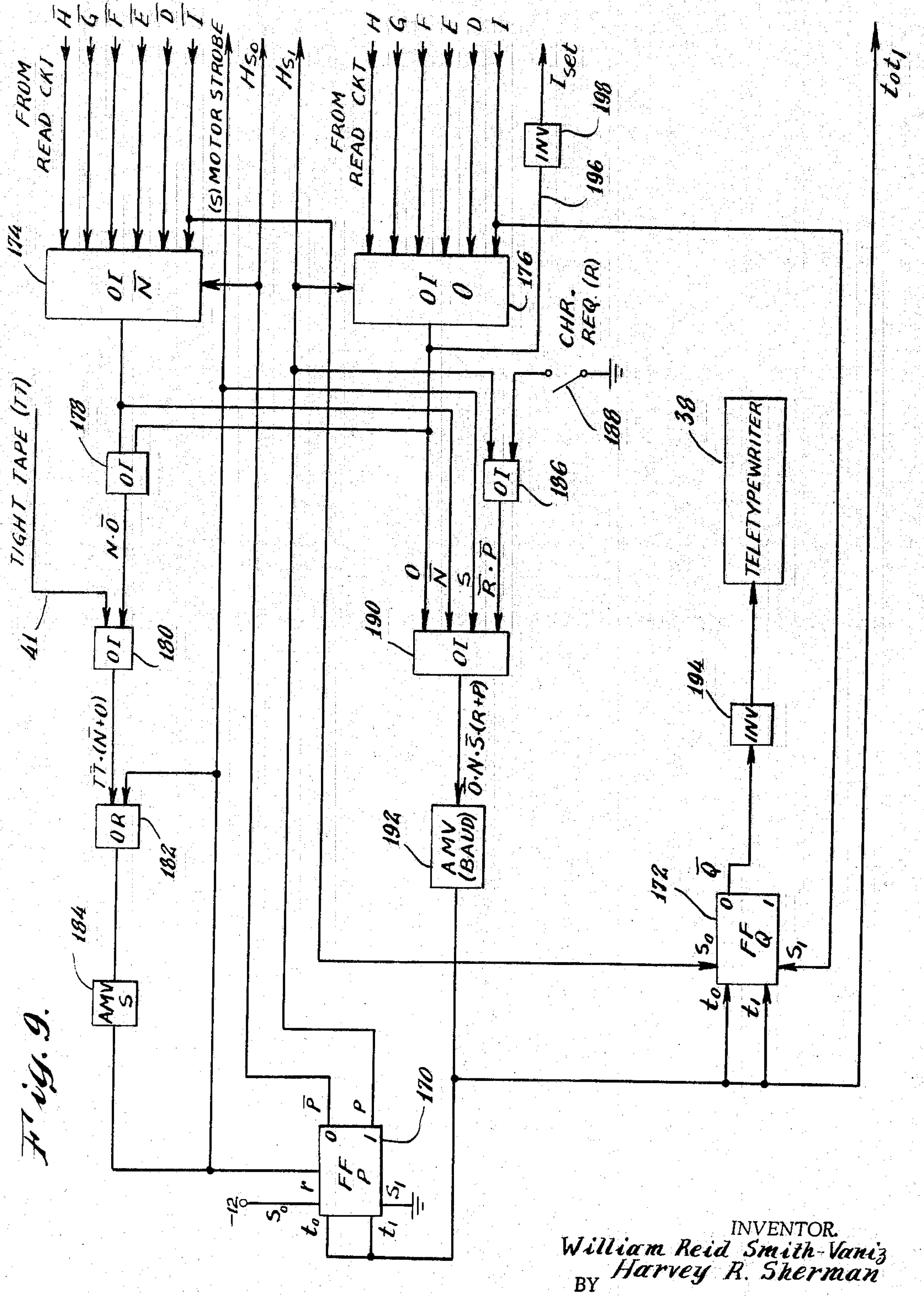
Figures 10, 11:
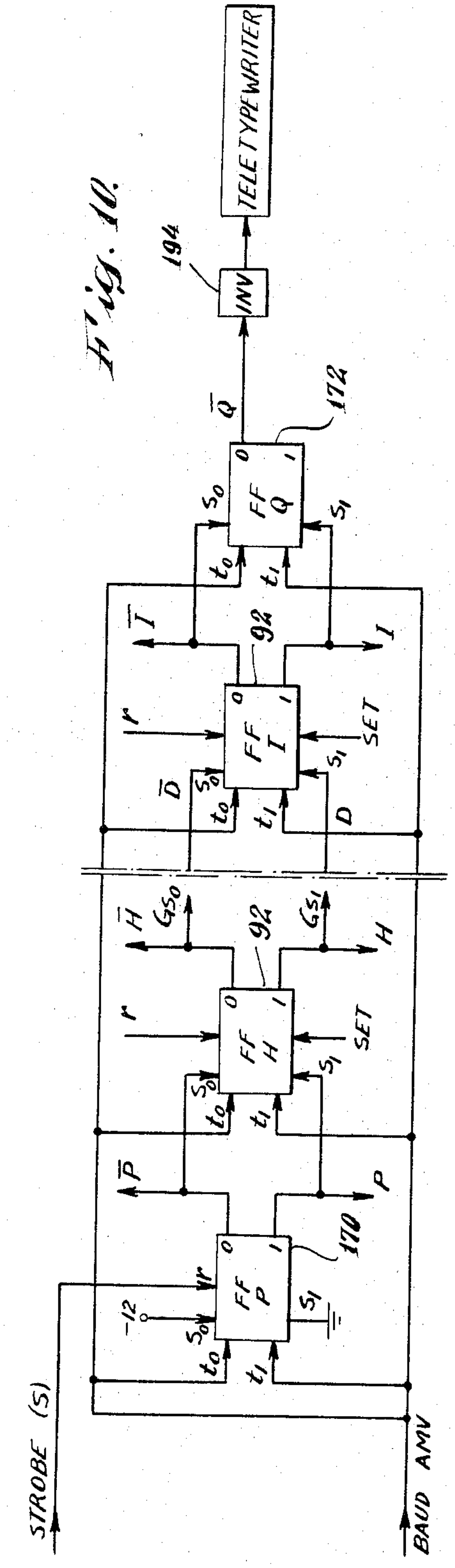

FIGURE 7*a* is a schematic wiring diagram of a modified pulse generator used in the control circuit of FIGURE 3;

FIGURE 7*b* is a timing diagram of various voltage waveforms developed in the pulse generator of FIGURE 7*a*;

FIGURE 8 is a logic block diagram, partially in schematic form, of a portion of the buffer control circuit of FIGURE 2;

FIGURE 9 is a logic block diagram, partially in schematic form, of a portion of the buffer control circuit of FIGURE 2;

FIGURE 10 is a logic block diagram of a portion of the read circuit of FIGURE 2;

FIGURE 11 is a table of the sequence in which the binary information units of each character, recorded and read simultaneously by the recorder-reproducer of FIGURE 2 are serialized by the buffer control and read circuits of FIGURES 9 and 10; and FIGURE 12 is a logic block diagram of a modification of a portion of the buffer control circuit and receiver of FIGURE 2 adapting the magnetic tape buffer storage system of FIGURE 2 to supply the binary information units of each character to the data receiver simultaneously.

The same reference characters refer to the same parts throughout the several views of the drawings.

GENERAL DESCRIPTION

*The recorder-reproducer*

Figure 1A:
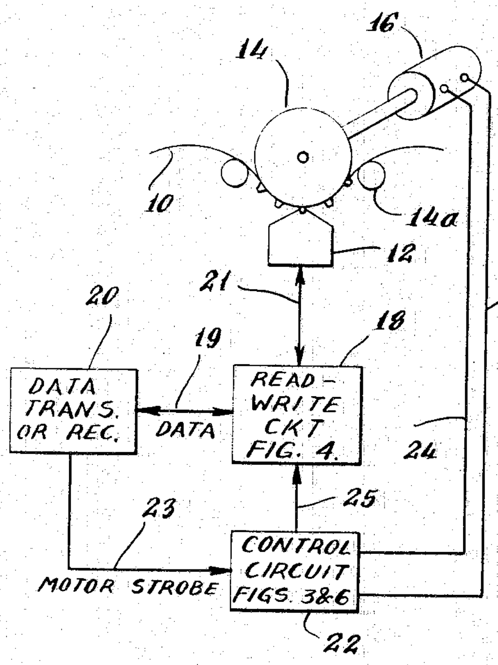
Figure 1B:
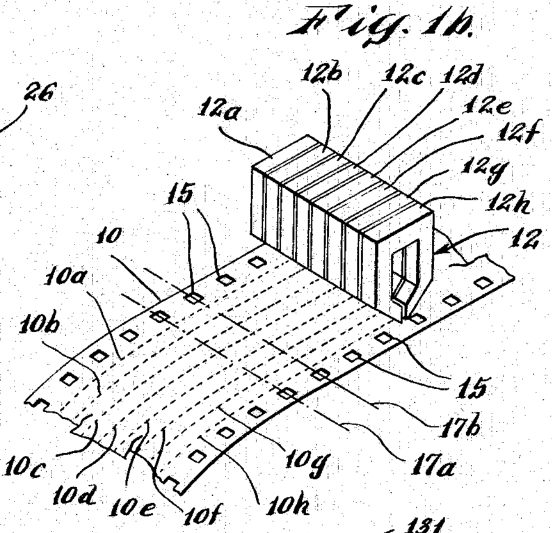

The recorder-reproducer of the present invention is capable of asynchronous recording and reproducing characters on a sprocketed magnetic tape. That is, the unit has the built-in capability of operating in either a "write" mode or a "read" mode, but, of course, not both modes concurrently. As seen in FIGURE 1*a* and 1*b*, the magnetic tape 10 is driven past a magnetic head unit 12 by a sprocket 14. The sprocket 14 having sprocket teeth **14*a* engaging sprocket holes 15 in the tape 10 is in turn driven by an incremental stepping motor 16**. The tape transport is preferably of the type described and claimed in the copending application of John R. Montgomery for "Tape Transports," Serial No. 349,350 filed March 4, 1964. It will be appreciated that rather than as shown in FIGURE 1*a* the sprocket 14 may be positioned beyond the head unit 12 to draw the tape 10 past the head unit.

The magnetic head unit 12 includes a plurality of individual magnetic heads **12*a*–12*h*, each associated with a distinct information channel or track on the magnetic tape 10** (FIGURE 1*b*). Thus, as shown in FIGURE 1*b*, eight individual magnetic heads **12*a*–12*h* are aligned transverse to the direction of translation of the magnetic tape 10 so that eight parallel channels 10*a*–10*h* of information can be recorded on the tape. By the same token, the magnetic heads 12*a*–12*h* have the capability of reading the information prerecorded in the same eight parallel channels on the tape 10**.

The individual heads **12*a*–12*h* of the magnetic head unit 12 are selectively and separately energized by a read-write circuit 18 to record one channel of information arriving from a data transmitter 20. This takes the form of discrete binary information units or "bits." In practice the data transmitter 20 may correspond to a computer, a telemetry or other communication receiver. Binary coded information is fed to the read-write circuit 18 over a plurality of data lines 19 on a parallel basis. Thus, each data line 19 is at one or the other of two possible states upon the arrival of each character and the state of each data line determines one bit of the arriving character. Since the bits of each character arrive simultaneously this is called, in the art, "parallel bit" transmission. Each of the magnetic heads 12*a*–12*h* is connected via a conductor of cable 21 to record the digital information bits arriving on one of the data lines 19**. Thus, the recording of each character is also said to be on a parallel bit basis.

If on the other hand, the read-write circuit 18 is in the read mode and the apparatus indicated at block 20 is conditioned to receive prerecorded data from the read-write circuit 18, the parallel recorded bits of each character recorded in the tape 10 are read out by the read-write circuit 18 and may be fed to the receiver 20 on a parallel bit basis or one at a time "serially" depending on the nature of the receiver.

To record or read out information, the tape 10 is swept past the magnetic head unit 12. The system is particularly adapted to record or read out characters asynchronously or randomly as dictated by the data transmitter or receiver 20. Accordingly, the tape 10 is translated only when there is a character to be recorded or there is a request for the output of a character.

As a write or read request, the receiver or transmitter 20 supplies a synchronizing motor strobe pulse to a control circuit 22 on clock pulse conductor 23. When the unit 20 is a transmitter of digital information, the motor strobe pulse is generated simultaneously with the transmission of each character on data lines 19 to the read-write circuit 18.

The control circuit 22 operates in response to each motor strobe pulse to alternately energize lines 24 and 26. The motor 16 is a stepping motor preferably of the type having a magnetic rotor and a center tapped field winding. The motor winding is alternately energized in opposite directions with D.C. current over lines 24 and 26 to step the rotor through a series of equally and angularly spaced magnetic detents. One such stepping motor that takes 20 incremental steps to make one revolution is the SIGMA CYCLONOME, 9AG series, manufactured by Sigma Instruments Inc. of Braintree, Massachusets. When using this motor, each clock pulse results in the sprocket 14 being rotated through an angle of 1.8°. The bits of each character coincident with each motor strobe pulse are temporarily stored in the circuit 18 during the initial period of each motor step and, as controlled by the control circuit 22 over control lines 25, are applied to the individual heads **12*a*–12*h* of the head unit 12** for recording on the tape, when the tape is moving at its maximum velocity.

When the apparatus of FIGURE 1 is operated as a magnetic tape playback unit or reader through appropriate conditioning of the control circuit 22, the unit 20 (in this case a data receiver) requests characters by transmitting a motor strobe pulse to the control circuit 22. It will be appreciated that these requests may occur asynchronously or synchronously as dictated by the requirements of the data receiver 20. The control circuit 22 in response to each motor strobe pulse operates to energize the motor 16 over lines 24 and 26 precisely as in the recording mode. The motor then takes a single incremental step exactly equal to a tape step performed during a recording operation. The control circuit 22 inhibits the read circuit 18 during the initial portion of a motor step. When the tape 10 reaches its maximum velocity of travel past the magnetic head unit 12, the control circuit 22 enables the read circuit 18 to read out the character recorded at that particular location on the tape. The character bit sensed by each magnetic head *12a–12h* of unit 12 is temporarily stored in a separate storage unit of the read-write circuit 18 for ultimate transmission to the data receiver 20.

The use of physically sprocketed magnetic tape insures a predetermined relationship between the position of the sprocket holes 15 and the bits of each character recorded on the tape 10.

*The buffer storage system*

A buffer storage system 29 according to the present invention and as shown in FIGURE 2, comprises a magnetic tape recorder 30 and a reproducer 32 and a loop 10 of sprocketed magnetic tape. The recorder 30 and reproducer 32 are each constructed in the manner of the recorder-reproducer of FIGURES 1*a* and 1*b*. Recorder 30 operates solely in the write mode and reproducer 32 operates solely in the read mode. The buffer store 29 is capable of recording characters arriving at one rate and reproducing the same characters at a different rate. Thus, the buffer storage system may be connected between communication systems over which characters are transmitted at different rates.

Still referring to FIGURE 2, the recorder or writer 30 includes a magnetic head unit 12′, a tape drive sprocket 14′, a stepping motor 16′, a control circuit 22′ and a write circuit 18′ each constructed and operating in the same manner as the correspondingly referenced elements of FIGURE 1*a*. The reproducer or reader 32 similarly includes a head unit 12″, a tape drive sprocket 14″, a stepping motor 16″, a control circuit 22″ and a read circuit 18″ each constructed and operating in the same manner as the correspondingly referenced elements of FIGURE 1*a*.

A data transmitter 34 (which may be located at a remote transmitting station) supplies the bits of each character and a clock pulse, simultaneously, to a buffer control circuit 36 over clock and data lines 35 and 37, respectively. The buffer control circuit 36 supplies bits of each character to the write circuit 18′ on data lines 19′. Simultaneously, it supplies a motor strobe pulse to the control circuit 22′ on motor strobe conductor 23′ to record the bits of each character in precisely located bit positions on the tape 10. The magnetic tape 10 moves from the writer 30 to the reader 32 where the information previously recorded by unit 30 is read out. The storage capacity of the buffer store 29 is only limited by the length of the tape loop 10.

The buffer control circuit 36 transmits a motor strobe pulse to the read control circuit 22″ to initiate a single read step in response to the receipt by the buffer control circuit 36 of a character request signal from a data receiver 38 on character request conductor 37. The bits of each character read out from the tape 10 by the reader 32 may be supplied to the buffer control circuit 36 for transmission in serial or parallel fashion to the data receiver 38 on data lines 39. Data receiver 38 may be located at a remote receiving station.

When the tape loop 10 between units 30 and 32 becomes tight, e.g. when the data receiver 38 continues to request characters at a faster rate than that at which data transmitter 34 is transmitting characters, a tight tape signal is supplied by a switch 43 actuated by the resulting depression of a tape idler roller 40. The buffer control 36 responds to this tight tape signal on tight tape conductor 41 by supplying a predetermined plurality of motor strobe pulses at the maximum possible stepping rate to the control circuit 22′. Writer 30 thereupon steps the tape 10 to again form a loop in the tape between writer 30 and reader 32 so that reader 32 may read out the characters recorded on the tape. The length of tape generated in response to a tight tape signal is referred to as a tape leader. During the making of a tape leader, the buffer control transmits special leader characters to the write circuit 18′ which are successively recorded on the tape 10 throughout the leader making operation. These special characters are distinguishable from information characters received from the data transmitter 34 so that, when read out by the reader 32, they are not transmitted to the data receiver 38.

SPECIFIC DESCRIPTION

*The control circuit 22*

Figure 4:
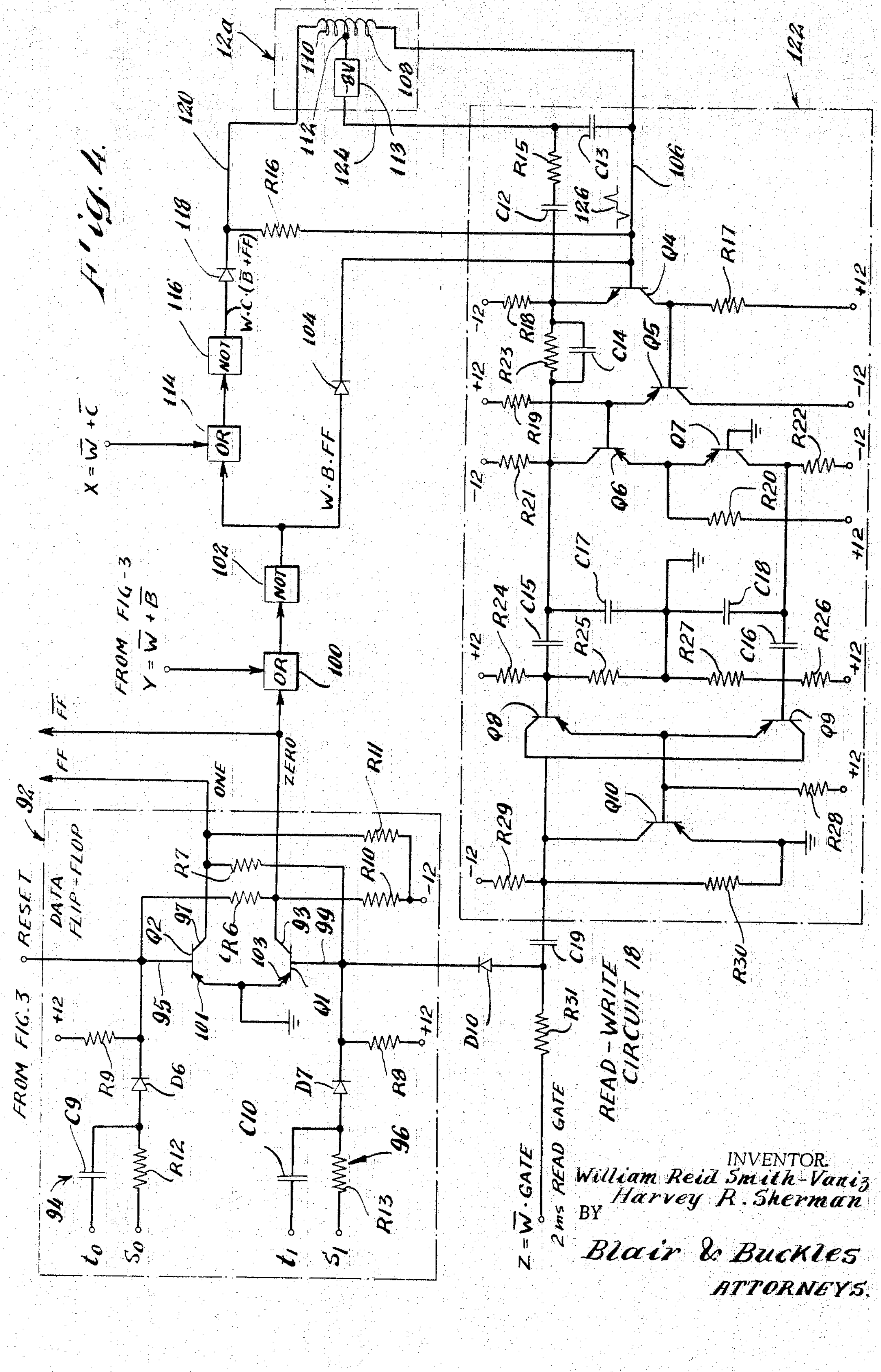
FIGURE 4 is a logic block diagram, partially in schematic form, of the read-write circuit of FIGURE 1*a;*

Referring to FIGURE 1*a*, motor strobe pulses generated by the transmitter 20 on line 23 simultaneously with the transmission of input information characters on line 19 (write mode) or upon a request for information characters (read mode) are applied to an input terminal 50 of the control circuit 22 shown in detail in FIGURE 3. These motor strobe pulses serve to synchronize the magnetic tape recorder-reproducer to the data transmitter or receiver 20. The control circuit 22 of FIGURE 3 operates to control each of a plurality of individual read-write circuits *18a–18h*, each connected to one of the magnetic heads *12a–12h*. Read-write circuit 18*a* and its connection to head 12*a* is shown in FIGURE 4. The control circuit of FIGURE 1 further conditions the read-write circuits to operate either in the read mode or in the write mode.

Referring to FIGURE 3, a positive going motor strobe pulse at terminal 50 is normally supplied through a capacitor C1 and a diode D1 to trigger a monostable multivibrator 52. A disable switch 54 shorts motor strobe pulses to ground in the event of a catastrophic failure in the tape transport system (FIGURE 1). Such catastrophic failures may include a tape jam where the continued stepping of the tape 10 would result in its damage. In practice, disable switch 54 is closed by pivotal movement of a tape idler roller in the event of abnormal tape tension; however, this disabling function should not be confused with the tight tape indication for initiating a leader making operation generally discussed in connection with the buffer storage system of FIGURE 2.

The multivibrator 52 is adjusted to provide a positive output signal A and a negative output signal $\overline{A}$, each having a duration of 1 millisecond. The A signal is supplied via conductor 53 to a reversible flip-flop 56 which includes input gating circuitry so as to change its state on the initial occurrence of the A signal. The complementary outputs *ff* and $\overline{ff}$ from the flip-flop 56 are used to control the energization of the stepping motor 16 over lines 24 and 26 in the manner described below under the heading Motor Control Circuit.

The positive going trailing edge of the $\overline{A}$ signal is differentiated by a series connected capacitor C2 and a diode D2 to produce a short positive pulse which triggers a delay multivibrator 58 and is differentiated by a series connected capacitor C3 and diode D3 to trigger GATE multivibrator 60. Delay multivibrator 58 is adjusted to provide a 1 millisecond negative signal upon being supplied with the positive pulse from diode D2. The positive going trailing edge of the 1 millisecond signal from delay multivibrator 58 is differentiated by series connected capacitor C4 and diode D4 to produce a short positive pulse. In response thereto B multivibrator 62 generates a negative going $\overline{B}$ signal having a one-quarter millisecond duration.

Figure 5:
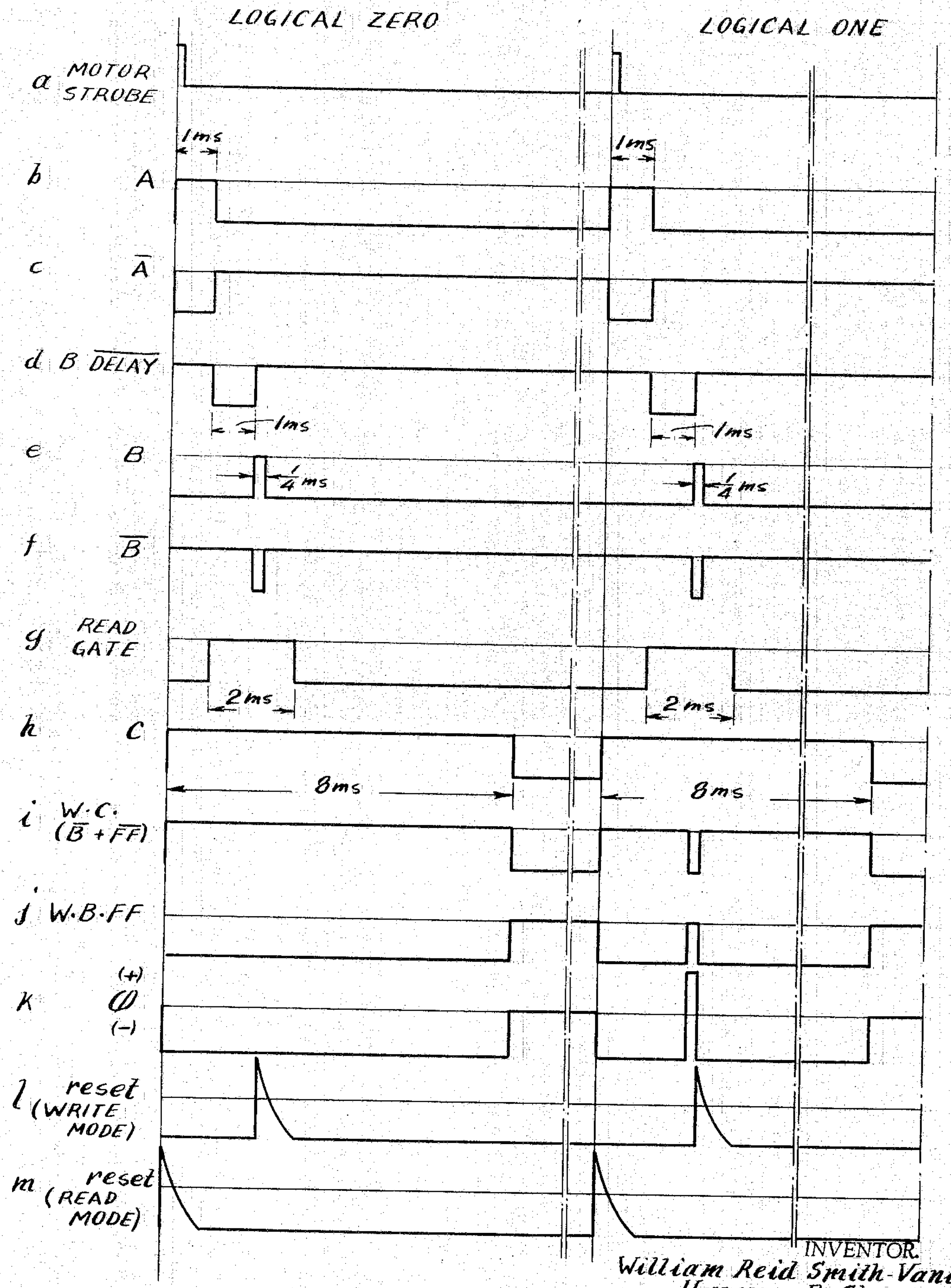
FIGURE 5 is a timing diagram illustrating the timing relationships between the various signals developed in the circuits of the recorder-reproducer of FIGURE 1*a*.

GATE multivibrator 60 is adjusted to produce a 2 millisecond "Gate" signal. The timing relationship of these pulses is shown in FIGURE 5. It will be appreciated, however, that the specific timing relationship shown is merely exemplary and should not be considered in a limiting sense.

The $\overline{A}$ signal from multivibrator 52 is also supplied to the input of an inverter circuit 64. The output A signal from inverter circuit 64 is supplied to a one-shot multivibrator 66. The one-shot multivibrator 66 is triggered by the positive-going leading edge of the A signal. Multivibrator 66 is adjusted to provide a negative-going output $\overline{C}$ signal having a duration of 8 milliseconds. This 8 millisecond duration for the $\overline{C}$ signal is chosen to be greater than the total time required to record one character so that it exists during the entire recording cycle. If a subsequent motor strobe pulse should occur before the end of this 8 milliseconds period, the multivibrator 66 produces a $\overline{C}$ signal for another 8 milliseconds in response to the initial positive rise of the A signal.

The negative $\overline{C}$ signal is supplied to one input of a positive OR gate 68. The second input of OR gate 68 is connected to a mode switch 70. Thus, when mode switch 70 is open (write mode), the second input to OR gate 68 is biased negative through a resistor R1. This negative bias, indicating the write mode, is hereinafter termed W. On the other hand, when mode switch 70 is closed, ground potential is applied to the second input of OR gate 68. This positive signal, indicating the read mode is hereinafter called $\overline{W}$.

Thus, a positive signal hereinafter called X, will occur at the output of OR gate 68 when $\overline{C}$ (not C) exists, i.e. when the input to gate 68 from the C multivibrator is positive or when $\overline{W}$ exists, i.e. when the control circuit 22 is in the read mode. This is indicated by the logic statement $X=$[exists when] $\overline{W}$ [the read mode exists]$+$[or] $\overline{C}$ [C does not exist]. As will be explained below the nonexistence of X, indicated by $\overline{X}$, is an 8 millisecond negative record gate from OR gate 68 supplied only during the record mode indicated by W.

A second positive OR gate 72 has one input connected to B multivibrator 62 while its other input is connected to the mode switch 70. An AND gate 74 has one input connected to multivibrator 60 and its second input connected to the mode switch 70.

The output of OR gate 72 is positive, indicated as Y, when the mode switch 70 is closed (read mode, $\overline{W}$), or when the .25 millisecond negative B signal from B multivibrator 62 does not exist, i.e. $Y=\overline{W}+\overline{B}$. Thus the output from OR gate 72 is negative, $\overline{Y}$, only when both the write mode W and the B signal exist. As will be seen below, this negative .25 millisecond $\overline{Y}$ signal is also used as a record gate.

The output of AND gate 74 is positive, indicated as Z only when both the write mode $\overline{W}$ and the 2 millisecond positive GATE signal from GATE multivibrator 60 exist. This is indicated by the logical statement (sometimes called Boolean Algebra) $Z=$[exists when] $\overline{W}$ [the read mode exist]$\cdot$[and simultaneously] GATE [the GATE signal exists]. As will be seen below, the positive Z signal is used as a read gate by the READ-WRITE circuits 18.

Still referring to FIGURE 3, the upper terminal of the mode switch 70 is connected through a resistor R2 to a junction 76 and then through capacitor C5 to the output A from multivibrator 52. The upper terminal of mode switch 70 is also connected to the input of an inverter circuit 78. The output of the circuit 78 is applied through a resistor R3 to junction 80 which also receives the output $\overline{B}$ from multivibrator 62 through a capacitor C6. In addition, the output from the inverter circuit 78 is coupled to a junction 82 through a capacitor C7. Junction 82 is connected to ground through a resistor R4. Junctions 76, 80 and 82 are connected as three separate inputs to a positive gate 84.

The OR gate 84 operates in response to a positive potential rise referenced to ground at any of the three junctions 76, 80 and 82 to provide a positive reset pulse $r$ at its output. Under one circumstance a reset pulse $r$ is generated on the application of the positive-going leading edge of the A pulse to junction 76 when the mode switch 70 is in the read or $\overline{W}$ condition (FIGURE 5*m*). In addition, a reset pulse $r$ is generated on application of the positive-going trailing edge of pulse $\overline{B}$ when the mode switch 70 is in the write mode or W condition (FIGURE 5*l*). An finally, when the mode switch 70 is switched from the read mode ($\overline{W}$) to the write mode (W), the negative going input to the inverter circuit 78 gives rise to a complemented positive-going potential transition at junction 82 resulting in the generation of a reset pulse $r$. Thus the output from the OR gate can be written logically as $r=A\uparrow\cdot\overline{W}+\overline{B}\uparrow\cdot W+W\uparrow$. That is, $r=$[exists] when $A\uparrow$ [at the positive rising beginning of the A signal]$\cdot$[if at the same time] $\overline{W}$ [the read mode exists]$+$[or] $\overline{B}\uparrow$ [at the positive rising ending of the $\overline{B}$ signal]$\cdot$[if at the same time] $W$ [the write mode exists]$+$[or] $W\uparrow$ [at trailing edge of read mode signal].

*The read-write circuit*

In FIGURE 4, there is shown a circuit diagram partially in schematic form and partially in logic block form of a read-write circuit 18*a*. Circuit 18*a* controls a magnetic head indicated at 12*a* to record or read out binary character bits from the magnetic tape 10. It will be appreciated that the circuitry of FIGURE 4 is duplicated for each magnetic head, therefore, when as in FIGURE 1*b* eight heads are used, eight distinct read-write circuits 18*a*–18*h* are required. The number of heads determines the number of parallel tape channels or tracks which may be processed and, by the same token, the number of parallel bits of binary information that can be accommodated by the read-write circuitry 18.

RECORD MODE

In considering the details of the circuitry of FIGURE 4, attention will first be directed to that portion of the circuitry concerned with recording or writing the character bits on the magnetic tape 10. As previously stated, the input character bits to be recorded occur simultaneously with the application of a motor strobe pulse to the input terminal 50 of the control circuit 22 of FIGURE 3. In order to store these character bits for the period of time necessary to record them on the tape, a storage element in the form of a flip-flop generally indicated at 92 is provided to store each of the incoming character bits.

The flip-flop 92 as seen in FIGURE 4 is a conventional bistable circuit including a pair of transistors Q1 and Q2. The collector 93 of Q1 is cross-coupled to the base 95 of Q2 through a resistor R6 while the collector 97 of Q2 is cross-coupled to the base 99 of Q1 through a resistor R7. Their emitters 101, 103 are grounded. The bases 99–95 of transistors Q1 and Q2 are connected to the positive supply through resistors R8 and R9, respectively, while their collectors 93, 97 are returned to the negative supply through resistors R10 and R11 respectively. The complementary outputs FF and $\overline{FF}$ are taken from the collectors of transistors Q2 and Q1, respectively.

The flip-flop 92 is triggered to the logical one state (FF being true) by application of a positive-going pulse to the base 99 of transistor Q1. In this condition, transistor Q1 is cut off and transistor Q2 is conducting to put ground potential on its collector 97. Conversely, flip-flop 92 is triggered to the logical zero state ($\overline{FF}$ being true) by a positive-going pulse at the base 95 of transistor Q2 which cuts this transistor off and, by virtue of the cross-coupling resistor R7, turns transistor Q1 on. Thus the output conditions are FF ground, $\overline{FF}$ negative 12 volts (logical one) and $\overline{FF}$ ground, FF negative 12 volts (logical zero).

The input circuitry of the flip-flop 92 includes a logical zero "steer gate" generally indicated at 94 and a logical one steer gate generally indicated at 96. A "steer zero" positive input is applied to terminal $s_0$ which is connected through a resistor R12 and a diode D6 to the base of transistor Q2. A "trigger zero" positive input is applied to terminal $t_0$ connected to the junction of resistor R12 and diode D6 through a capacitor C9. Accordingly, a positive-going pulse at $t_0$ is effective to cut transistor Q2 off and turn transistor Q1 on when the $s_0$ terminal is positive, e.g. referenced to ground potential. On the other hand, when $s_0$ is held at a sufficiently negative potential, positive-going $t_0$ pulses are blocked by the back-biased diode D6. Similarly, steer gate 96 includes a "steer one" input terminal $s_1$ connected through a resistor R13 and a diode D7 to the base of transistor Q1 for steering positive-going "trigger one" pulses applied at terminal $t_1$ through a capacitor C10. The operation of steer gate 96 is identical to that ascribed for steer gate 94.

In the illustrated embodiment of the present invention, a logical one character bit is indicated by the presence of a positive input pulse while a logical zero character bit is indicated by an absence of an input pulse. With the incoming information taking this form, we may reset each of the flip-flops 92 to the logical zero state by positive-going reset pulse *r* from OR gate 84 (FIGURE 3) applied directly to the base of transistor Q2 prior to each recording operation. The incoming character bits on lines 19 (FIGURE 1*a*) are each applied to the corresponding $t_1$ terminal of one of the flip-flops 92 and the $s_1$ input terminals are permanently grounded. Steer gate 94 is preferably permanently disabled by holding the $s_0$ input at a negative 12 volt potential. The reset pulse *r* is generated at the conclusion of the previous .25 millisecond recording gate ($\overline{B}\uparrow \cdot W$) as will be seen.

Although it is contemplated that the incoming characters are transmitted from the data transmitter 20 (FIGURE 1*a*) on a parallel bit basis, with each parallel binary bit being simultaneously applied to separate $t_1$ inputs to the individual flip-flops 92, it will be appreciated that the digital bits may arrive serially and be selectively steered into the appropriate flip-flops in preparation for their recordation on the tape 16 in bit parallel. Alternatively the individual flip-flops 92 may be interconnected as a shift register with the serially arriving digital bits being shifted into the shift register to effect the necessary serial to parallel binary bit conversion.

Thus if the incoming character bit is a logical one as indicated by the presence of a positive-going pulse, the flip-flop 92 is triggered to its logical one state. On the other hand, if the incoming character bit is a logical zero as represented by the absence of an input pulse, the flip-flop 92 will remain in its reset or logical zero state.

In the circuit of FIGURE 4, as well as subsequent figures of the drawings, a condition of a signal line is true if the line is at ground potential and, conversely, the condition is false if its signal line is at a negative potential. Similarly all AND and OR gates shown are responsive to positive potentials to produce the appropriate output potential, i.e., all are positive gates.

The logical one and logical zero output lines are brought out from the collectors of transistors Q2 and Q1, respectively, as FF and $\overline{FF}$ for connection to the output requesting device or receiver 20 (FIGURE 1*a*) when the circuit of FIGURE 4 is operating in the read the OR gate 100 is connected to the output Y of the OR mode.

The logical zero output $\overline{FF}$ from flip-flop 92 is applied as one input to an OR gate 100. The second input of gate 72 of FIGURE 3. Y is positive when the unit is in the read mode or when the .25 millisecond record gate does not exist. In logical notation $Y=\overline{W}+\overline{B}$.

The output from the OR gate 100 can then be expressed as $\overline{W}+\overline{B}+\overline{FF}$. This logical function is inverted in a NOT circuit or inverter 102. In an inverter or NOT circuit, when the input is positive, the output is negative and vice versa. The combination of the OR gate 100 and the NOT circuit 102 gives an OR-INVERTER logical function. When a logical OR function is inverted, it becomes an AND function. Thus, the output from the NOT circuit 102 is only positive if the unit is in the write mode, W, if the .25 millisecond record gate, B, exists and if the DATA flip-flop is in the ONE state, FF. The output of NOT circuit 102 in logical notation is W·B·FF which is connected through a diode 104 via conductor 106 to the lower half 108 of the center tapped winding of magnetic head **12*a***.

According to the present invention the head winding halves 108 and 110 are energized alternately to record logical ones and zeros. The center tap 112 is biased at minus 8 volts potential by source 113.

Thus, if W is true (mode switch 70 of FIGURE 3 in the write mode) and the one-quarter millisecond B pulse is true (one-shot multivibrator 62 of FIGURE 3 triggered to its unstable state) and FF is true (flip-flop 92 of FIGURE 4 storing a logical one digital information bit), the output from NOT circuit 102 is true and at ground potential. Diode 104 is forward biased and current flows from the source 113 through the center tap 112, the lower winding 108 of the head **12*a* and diode 104 to ground at the output of NOT circuit 102. On the other hand, if either W, B or FF are not true, i.e., either $\overline{W}$ (read mode), $\overline{B}$ (no .25 millisecond record gate) or $\overline{FF}$ (logical zero) being true, the output from the NOT circuit 102 will be at a negative potential sufficient to back bias diode 104 and no current will flow through the lower winding 108 of magnetic head 12*a***.

In order to write a zero on the tape, the output W·B·FF from the NOT circuit 102 is applied as one input to an OR gate 114. The other input of OR gate 114 is connected to the output X of the OR circuit 68 of FIGURE 3. Since $X=\overline{W}+\overline{C}$, the output from the OR gate 114 is $\overline{W}+\overline{C}+W\cdot B\cdot FF$. This is inverted in a NOT circuit 116 whose output is $W\cdot C\cdot(\overline{W}+\overline{B}+\overline{FF})$. Since W and $\overline{W}$ can't both be true at the same time, this can be reduced to $W\cdot C\cdot(\overline{B}+\overline{FF})$.

Thus the output from the NOT circuit 116 is true, i.e., at ground potential, if W is true (mode switch 70 in write mode), *and* if C is true (when multivibrator 66 of FIGURE 3 is in its unstable state, producing the 8 millisecond record gate), *and* if either $\overline{R}$ is true (multivibrator 62 of FIGURE 3 in its stable state) *or* $\overline{FF}$ is true (flip-flop 92 storing a logical zero). With ground potential at the output of NOT circuit 116, a diode 118 in its output circuit conducts to permit current flow from source 113 through the upper head winding 110 via conductor 120 and the diode 118 to ground. On the other hand if W or C or both $\overline{B}$ and $\overline{FF}$ are false, (read mode or no read gate or a one is being recorded) the output from the NOT circuit 116 is at a negative potential to back bias diode 118. This blocks current flow through the upper head winding 110.

Thus, the present invention utilizes a return to bias technique to record the logical one and logical zero information bits on the magnetic tape 10. The magnetic tape is continuously magnetized in a first or negative bias direction to record a logical zero by continuously energizing winding 110 for 8 milliseconds. To record a logical one, the direction of magnetization is momentarily reversed to the positive direction for a quarter of a millisecond (the duration of the B pulse) and then returned to the negative bias direction. This is accomplished by energizing winding 110 for 2 milliseconds then energizing winding 108 for .25 millisecond and then energizing winding 110 for the remaining 5.75 milliseconds of the recording cycle.

On readout these flux reversals (changes in direction of magnetization) induce a readout signal in the head winding halves 108, 110. This readout signal consists of a pair of voltage pulses one-quarter milliseconds apart induced in the windings of the magnetic head 12*a* and represents a logical one whereas the absence of a readout signal represents a logical zero.

Magnetization of the magnetic tape in the negative direction is accomplished by passing current from source 113 through the upper head winding 110; whereas magnetization in the positive direction is obtained by passing current from source 113 through the lower head winding 108. The direction of current flow through the magnetic head winding thus depends upon which of the windings 108 or 110 carries current.

In recapitulation, a logical zero is recorded on the magnetic tape when diode 118 is forward biased, i.e., ground potential exists at the output of NOT circuit 116, for the period that the expression $W\cdot C\cdot(\overline{B}+\overline{FF})$ is true. Since $\overline{FF}$ is true when recording a logical zero, the above expression is independent of $\overline{B}$ and current flows through the winding half 110 for the entire period of the recording cycle as determined by the 8 millisecond duration of the C pulse.

When recording a logical one, diode 118 is forward biased during the period that the expression $W\cdot C\cdot\overline{B}$ is true. Since we are recording a logical one, $\overline{FF}$ is false. $\overline{B}$ is true for the entire recording cycle except for the one-quarter millisecond time that the one-shot multivibrator 62 of FIGURE 3 is triggered to its unstable state. Thus, during this one-quarter millisecond time period, the output $W\cdot C\cdot\overline{B}$ from NOT circuit 116 is false and diode 118 is back biased by the negative potential imposed on its anode.

On the other hand during the occurrence of this B gate, the output W·B·FF at NOT circuit 102 is true thus forward biasing diode 104 to pass current through the lower winding 108. As a result to record a logical one the current through the head winding is momentarily switched from the upper half 110 to the lower half 108 during the quarter millisecond period that the B output from one-shot multivibrator 62 of FIGURE 3 is true (see FIGURES 5*i*, 5*j* and 5*k*).

The timing relationship of the various control pulses issuing from the control circuit 22 of FIGURE 3 and the write circuit portion of FIGURE 4 can be observed from an inspection of FIGURE 5. The development of the write control outputs $W\cdot C\cdot(\overline{B}+\overline{FF})$ and W·B·FF are synchronized to the A pulse which also initiates the motor step through the triggering of flip-flop 56. Thus the recording of the information bits is synchronized to the step translation of the magnetic tape 10 for each recording cycle and the relative positions of the recorded bits are precisely located in reference to the tape sprocket holes to insure satisfactory registration on playback.

Referring again to FIGURE 1*b*, in the preferred embodiment of the invention, sprocket holes 15 are 300 mils apart center to center (one mil is 0.001 inch). The output shaft rotation of the motor 16 is appropriately geared down and the diameter of the sprocket 14 is such that each rotational step of 1.8° translates the tape 10 through a linear distance of 15 mils, thus giving a recording density of 66⅔ bits per inch. Thus, 20 tape steps are required to translate a fixed point on the tape 10 through 300 mils; the distance between sprocket holes 15. Now if the recording cycle is coordinated with the tape translation so as to record character bits in bit positions on the tape aligned precisely with the center line 17*a* of a pair of sprocket holes 15 on opposite edges of the tape, then on the 21st tape step the recorded character bits will occupy transverse bit positions aligned precisely with the center line 17*b* of the next succeeding pair of sprocket holes 15. Thus every bit position on the tape 10 is located in reference to adjacent sprocket holes. Moreover, uniform synchronization between read-write circuit operation and tape translation is maintained and the tape may be arbitrarily threaded on the sprocket 14 and proper registration is insured on readout since the bit positions are also symmetrically located about adjacent sprocket holes 15.

Registration is a particularly important consideration when recording a logical one for, on playback, it is necessary that the pairs of flux reversals disposed in the various bit positions (FIGURE 5*k*) pass the gaps in the magnetic heads 12*a*–12*h* approximately at the time of maximum tape velocity to induce readout signals of maximum amplitude. It therefore becomes important that the B gate occur substantially at the instant of maximum tape velocity during each recording cycle. By proper adjustment of the delay multivibrator 58 (FIGURE 3) this condition can be readily met. Since the occurrence of the B gate determines when a logical one character bit is recorded, the delay of the B gate from the start of the motor step corresponds to the time required for the tape to come up to maximum speed. Inasmuch as the motor characteristics remain constant irrespective of operating mode (write or read), the flux reversals pass the read heads substantially at the time of maximum tape velocity.

In order to insure proper registration between the bit positions on the tape 10 and the magnetic head unit 12″ of the reader 32 (FIGURE 2) at the moment of maximum tape velocity during each tape step, it is initially necessary to adjust the sprockets 14′, 14″ to have identical angular orientations relative to the head gaps of the respective head units 12′, 12″. With the write motor 16′ and the read motor 16″ taking identical steps, proper registration is maintained.

In the write operational mode, W, it will be recalled from the discussion of FIGURE 3 that the reset pulse *r* for flip-flops 92 (FIGURE 4) is generated according to the statement $$r=A\uparrow\cdot\overline{W}+\overline{B}\uparrow\cdot W+W\uparrow$$

Thus a reset pulse *r* is generated by the positive-going trailing edge of the $\overline{B}$ gate when the mode switch 70 is in the write mode. Comparing FIGURES 5*k* and *f*1, it will be seen that the flip-flops 92 are reset to logical zero at the conclusion of the time when a logical one can be recorded and is thus preconditioned for the next recording cycle.

In the situation where the magnetic tape storage unit was previously being operated in the read mode, it is desired that all of the flip-flops 92 be cleared, i.e., reset, on conversion to the write mode. Accordingly an *r* pulse is generated upon initiation of the write mode, W↑, when the mode switch 70 is switched from the read mode to the write mode.

When the magnetic tape storage unit is conditioned for the read operational mode $\overline{W}$, the reset pulse *r* is generated for the condition $A\uparrow\cdot\overline{W}$, where A↑ is the leading edge of the A signal. Thus the flip-flops 92 are reset at the very beginning of the motor step and are ready to be triggered by the readout of a logical one occurring approximately 2 milliseconds later.

It will be appreciated that all of the control outputs issuing from control circuit 22 (FIGURE 3) are individually applied to all of the read-write circuits 18*a*–18*h*; with each being identical in circuit configuration to that disclosed in FIGURE 4. Thus, the reset pulse *r* and the X, Y and Z outputs are connected to all read-write circuits 18 over control lines 25 (FIGURE 1*a*).

READ MODE

Still referring to FIGURE 4, in reading character bits from the tape only the lower head winding 108 is used. Accordingly, winding 108 is connected in circuit between source 113 and the input of a read amplifier, indicated generally at 122 via conductors 106 and 124. As can be seen from the magnetization pattern shown in FIGURE 5*k* the recordation of a logical one is represented by a flux reversal from a negative saturation to a positive saturation and, one-quarter millisecond later, a flux reversal from positive saturation to negative saturation.

Since no flux reversals occur during the recording of a logical zero (FIGURE 5*k*), the read amplifier 122 is quiescent during the reading of a logical zero. However, on reading a logical one, the pair of flux reversals on the tape induce a readout signal in winding 108, shown at 126 as a negative pulse corresponding to the first flux reversal and, one-quarter of a millisecond later, a positive pulse corresponding to the second flux reversal.

Considering the read amplifier 122 in detail, the pulses 126 on line 106 are applied to the base of a transistor amplifier Q4. The minus 8 volt potential at the center tap 112 of the head winding is connected over line 124 and through series resistor R15 and capacitor C12 to the emitter of the transistor amplifier Q4. A bypass capacitor C13 is connected between conductors 106 and 124 to filter out any high frequency noise on them. A resistor R16 is connected across the head winding from line 120 to line 106 to load the head winding during current switching when recording logical ones and zeros.

The collector of transistor Q4 is connected to a plus 12 volt regulated supply through a resistor R17 while its emitter is connected to a negative 12 volt regulated supply through a resistor R18. The output appearing on the collector of the transistor Q4 is D.C. coupled to the base of an emitter follower transistor Q5. The collector of transistor Q5 is tied to the negative 12 volt supply while its emitter is connected through a resistor R19 to the plus 12 volt supply. The emitter of transistor Q5 is tied to the base of a transistor Q6 which in combination with transistor Q7 comprise a phase inverter pair. The emitters of transistors Q6 and Q7 are tied together and returned through a resistor R20 to the plus 12 volt supply. The collectors of transistors Q6 and Q7 are returned through resistors R21 and R22, respectively, to the negative 12 volt supply while the base of transistor Q7 is grounded.

In addition, the collector of transistor Q6 is coupled back through the parallel combination of a resistor R23 and a capacitor C14 to the emitter of transistor amplifier Q4. The parallel combination of resistor R23 and capacitor C14 and the series combination of resistor R15 and capacitor C12 provide a feedback circuit for controlling the gain of the first three stages of the amplifier circuit 122. This feedback path serves to integrate the signals from magnetic head 90 and thereby discriminate against amplitude variations due to variations in tape velocity.

It will be appreciated that, if the first flux reversal on the tape sweeps past the magnetic head gap at a time prior to the time the tape achieves maximum velocity, the first induced pulse will be lower in amplitude than the second induced pulse. However, since the change in flux is always constant, the duration of this reduced amplitude pulse will be longer in order to maintain the area under this pulse constant. Since integration of a function expresses the area defined by the function, the feedback path serves to produce substantially constant amplifier response to the input pulses from the magnetic head 12*a*.

The collectors of the phase inverter pair, transistors Q6 and Q7, are coupled through capacitors C15 and C16, respectively, to the bases of an emitter follower pair, transistors Q8 and Q9. The input on the base of emitter follower Q8 is referenced to the junction between resistors R24 and R25 which make up a potential divider connected between the plus 12 volt supply and ground. By the same token, the input on the base of emitter follower Q9 is similarly referenced to the potential at the junction between resistors R26 and R27 which comprise a potential divider connected between the plus 12 volt supply and ground. In addition, the input lines connecting the collectors of transistors Q6 and Q7 to the bases of emitter followers Q8 and Q9 are each coupled to ground through capacitors C17 and C18, respectively.

The respective collectors and emitters of emitter follower transistors Q8 and Q9 are tied together with the common emitter circuit connected to the base of an output transistor Q10 while the common collector circuit is connected to the collector of output transistor Q10. The base of transistor Q10 is returned to the plus 12 volt supply through a resistor R28 while its emitter is tied to ground. The output on the collector of transistor Q10 is referenced to the potential at the junction between resistors R29 and R30 comprising a voltage divider connected between the negative 12 volt supply and ground.

The output appearing on the collector of output transistor Q10 is applied through a capacitor C19 and a diode D10 directly to the base of transistor Q1 of flip-flop 92. This output is steered by the potential appearing at the Z terminal which is connected to the anode of diode D10 through a resistor R31. The signal at the Z terminal is determined by the output $\overline{W}$ · GATE from AND gate 74 of FIGURE 3.

Considering the operation of FIGURE 4 in amplifying a readout signal corresponding to a logical one character bit read from the magnetic tape 10 by magnetic head 12*a*, the first occurring negative pulse and the second occurring positive pulse, superimposed on the negative 8 volt reference level as indicated at 126, are applied to the base of transistor amplifier Q4. The output appearing on the collector of the transistor amplifier Q4 is inverted and amplified for application to the base of the emitter follower Q5. The output on the emitter follower Q5 is in phase with the input signal at its base and is applied to the base of transistor Q6 of the phase inverter pair. The resulting output on the collector of transistor Q6 is out of phase with the input to the phase inverter pair while the output appearing on the collector of transistor Q7 is in phase with this input. These complementary output signals are applied to the bases of emitter followers Q8 and Q9. The common emitter circuit of transistors Q8 and Q9 will develop a pair of negative-going pulses one-quarter of a millisecond apart which are individually effective to drive the output transistor Q10 into saturation. The resulting output on the collector of output transistor Q10 consists of a pair of positive-going pulses spaced apart by a quarter of a millisecond and having a peak amplitude of 6 volts. These positive-going output pulses are individually effective when passed through capacitor C18 and diode D10 to the base of transistor Q1 to set the flip-flop 92 to its logical one state. Providing two separate positive pulses gives the amplifier 122 two separate opportunities to trigger the flip-flop 92 to the logical one state on reading a logical one from the tape 10 and thus ensures the desired operation during conditions of extreme tape jitter, i.e. nonuniform tape motion.

The output from the AND circuit 74 of FIGURE 3 applied to the Z terminal in FIGURE 4 operates to inhibit the passage of any signals through diode D10 except during the period that the mode switch 70 of FIGURE 3 is in the read mode, $\overline{W}$, and, coincidentally therewith, the 2 millisecond GATE pulse is generated by the one-shot multivibrator 60 of FIGURE 3, i.e., $\overline{W}$ · GATE. This inhibiting function is accomplished by maintaining the Z terminal at a negative potential to back bias and thereby inhibit the passage of signals through diode D10. On the other hand, with the Z terminal held at ground potential, the output signals from transistor Q10 readily pass through diode D10 to trigger flip-flop 92 to the one state. Thus, the signal level at the Z terminal is controlled so as to be enabling only during the time period when logical one character bits should be recorded on the tape, i.e. when GATE·$\overline{W}$ is true and at ground potential. Otherwise, the signal level at terminal Z is disabling thereby precluding the possibility of the flip-flop 92 being triggered to the logical one state by spurious signals.

From a comparison of FIGURES *5e* and *5g*, it will be seen that the GATE pulse straddles the time period during which a logical one should appear on the tape as previously recorded on occurrence of the B pulse. The GATE pulse thus straddles the time period during which the tape achieves maximum velocity. The width of the GATE pulse, shown to be two milliseconds in the disclosed embodiment, is largely determined by the expected degree of jitter arising from variations in relative location of the flux reversals on the tape and the magnetic head gaps at the instant of maximum tape velocity. In addition however, the width of the GATE pulse must be reconciled with the degree of selectivity required to prevent triggering of the flip-flop 122 by spurious noise. It has been found that a two millisecond GATE pulse provides a satisfactory compromise.

*Motor control circuit*

Figure 6:
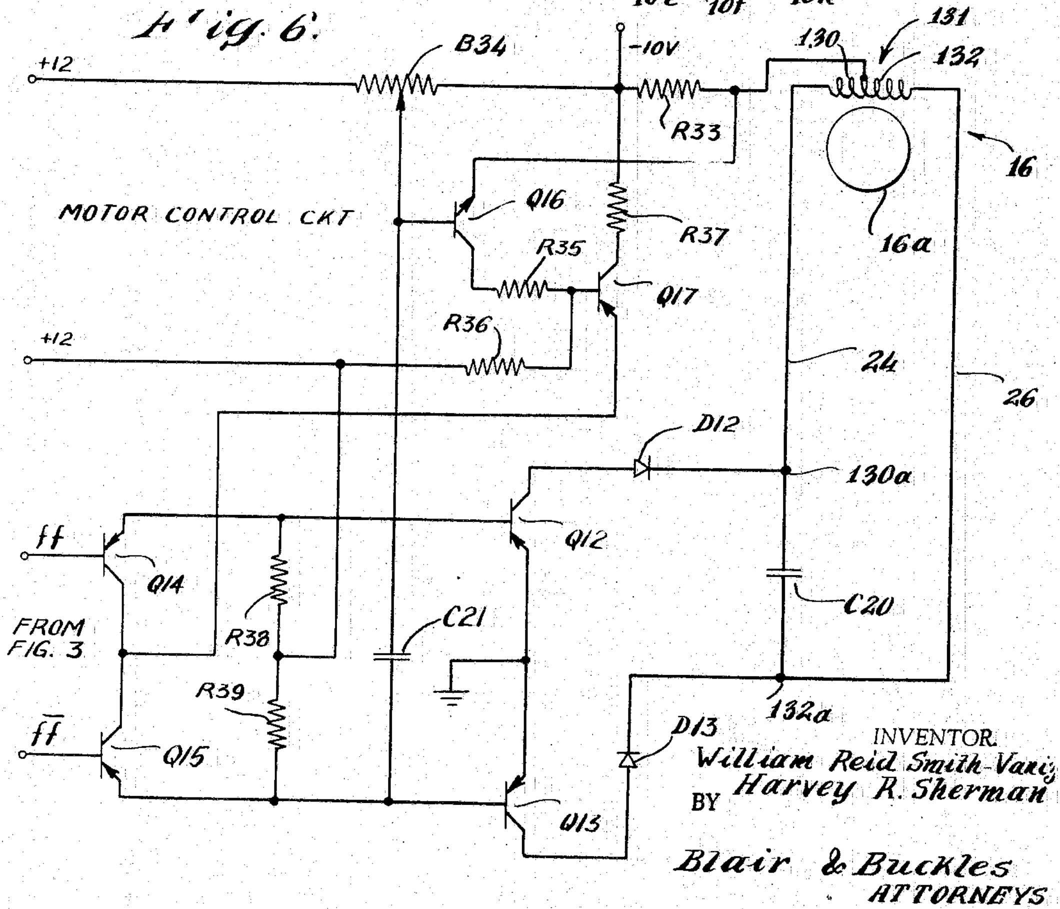
FIGURE 6 is a schematic wiring diagram of a portion of the control circuit of FIGURE 1*a*.

Referring to FIGURE 6, the motor, shown generally at 16, is controlled to rotate through a discrete incremental step on each occurrence of a motor strobe pulse at the terminal 50 of FIGURE 3. This is accomplished by alternate energization of motor winding halves 130 and 132 from a common negative 10 volt source applied through a resistor R33 to the center top of motor field winding 131. The other side of winding half 130 is returned through conductor 24, a diode D12 and the collector-emitter circuit of a transistor Q12 to ground. The other side of motor winding half 132 is returned to ground through conductor 26, a diode D13 and the collector-emitter circuit of a transistor Q13. Transistors Q12 and Q13 are operated in alternating fashion under the control of a pair of emitter follower transistor drivers Q14 and Q15, which are in turn controlled by the complementary outputs *ff*, $\overline{ff}$ derived from the reversible flip-flop 56 of FIGURE 3. The outputs *ff* and $\overline{ff}$ assume complementary voltage levels, that is, when one is negative the other is at ground potential. Assuming that *ff* is negative as applied to the base of emitter follower Q14, the negative potential at its emitter when coupled to the base of transistor Q12, drives this latter transistor into conduction. It is thus seen that the energization circuit for motor winding half 130 is completed. On the other hand with the input $\overline{ff}$ remaining at a positive level, the resulting positive output on the emitter of emitter follower transistor Q15 drives transistor Q13 into cutoff thereby keeping the energization circuit for motor winding half 132 open. On occurrence of the next motor strobe pulse at input terminal 50 of FIGURE 3, reversible flip-flop 56 is triggered by the A pulse to reverse its previously existing output condition. Thus, $\overline{ff}$ goes negative whereas *ff* assumes a positive potential level. It is thus seen that transistor Q12 is driven to cutoff interrupting the energization circuit for motor winding half 130 while transistor Q13, with a negative potential on its base, is driven into conduction to complete the energization circuit for motor winding half 132 and the rotor, indicated schematically at 16*a*, makes another incremental rotational step. The configuration of the permanent magnet rotor 16*a* and the distribution of the motor field poles cause the rotor to move through an increment of rotation to assume progressive angular positions with respect to the field poles each time the energizing field current is switched from one field winding half to the other.

According to the present invention, the transfer of energizing current from one motor field winding half to the other is aided by a capacitor C20 connected between terminals 130*a* and 132*a* of the field winding halves 130 and 132, respectively. Generally speaking, the function of the capacitor C20 is to transfer the energy stored in the energized motor winding halves 130, 132 from one to the other when the transistors Q12 and Q13 operate to switch the energizing current from one winding half to the other. With the inclusion of capacitor C10 the energy stored in one winding half can be used to aid the transfer of energizing current to the other winding half on operation of transistors Q12 and Q13 thus permitting faster stepping rates as well as conserving power and reducing the heat dissipation required at the motor. Without capacitor C20, this stored energy must be dissipated as heat and serves no useful purpose.

In order to appreciate the contribution of the capacitor C20, assume that transistor Q12 is in conduction thereby completing the energization circuit for exciting motor winding half 130. During this condition, transistor Q13 is cut off to prevent any energizing current flow through motor winding half 132. At the instant that transistor Q12 is driven to cut off the energizing current flow through motor winding half 130 is interrupted, the energy associated with the collapsing magnetic field of motor winding half 130 establishes an oscillating current in the resonant circuit including the motor winding halves 130, 132 and capacitor C20. During the first half cycle of this oscillating current, junction 132*a* goes positive to back bias diode D13. As the oscillating current completes its first half cycle and starts into the second half cycle, junction 132*a* goes negative to forward bias diode D13 thereby "latching in" the energization circuit for motor winding half 132 from the negative 10 volt supply through the collector-emitter circuit of transistor Q13, which is now conducting. Thus after one-half cycle of oscillation, the energizing current is completely switched from the motor winding half 130 to motor winding half 132 while, at the same time, all the energy stored in motor winding half 130 is transferred to the motor winding half 132.

It will thus be seen that the capacitor C20 constitutes an intermediary storage element which transfers the otherwise unused energy associated with the collapsing magnetic field of motor winding half 130 to the motor winding half 132, and vice versa, on operation of the transistors Q12 and Q13. As the energizing current terminates in winding half 130, the collapsing magnetic field of winding half 130 induces a current which flows in the same direction as did the energizing current. This induced current charges the capacitor C20 causing the terminal 132*a* to swing positive during the first half cycle of resonance. When the capacitor C20 is fully charged and thus the energy previously associated with winding half 130 is stored in the capacitor, the second half cycle of resonance begins. Terminal 132*a* goes negative as capacitor C20 discharges to cause current flow through winding 132. Diode D13 is rendered conductive to clamp terminal 132*a* to substantially ground potential as derived through the emitter-collector circuit of transistor Q13. Thus further resonant circuit oscillations are prevented and the energy is transferred from motor winding half 130 to winding half 132. On the next motor step the operation is reversed to transfer the energy from winding half 132 to winding half 130.

In order to insure that the characteristics of each motor step are identical and particularly that each incremental rotational movement of the motor shaft follows the same angular velocity curve regardless of the stepping rate, the remainder of the circuitry of FIGURE 6 operates to maintain a constant voltage drop across the resistor R33. By maintaining a constant voltage drop, it will be seen that the current through resistor R33 which constitutes the energizing current through the motor windings 130 and 132 is held constant to insure constant and repeatably motor step characteristics.

Accordingly, the junction between the negative 10 volt source and the resistor R33 is connected to the positive 12 volt regulated supply through a resistor R34. A reference voltage is tapped from resistor R34 and applied to the base of a transistor amplifier Q16 whose emitter is connected directly to the low side of the resistor R33. The collector of transistor Q16 is connected through resistors R35 and R36 to a positive supply voltage.

The junction between resistors R35 and R36 is connected directly to the base of a transistor Q17. The collector of transistor Q17 is connected through resistor R37 to the junction between the negative 10 volt supply and resistor R33 while its emitter is returned to the common collector circuit of transistors Q14 and Q15. The emitters of transistors Q14 and Q15 are returned through resistors R38 and R39, respectively, to the positive supply voltage. Then to complete the circuitry of FIGURE 6, the base of transistor amplifier Q16 is coupled to the emitter of transistor Q15 through a capacitor C21 whose function is to suppress oscillations which may otherwise occur.

In operation, transistor amplifier Q16 functions to compare the voltage drop across resistor R33 as applied to its emitter with the reference voltage tapped from resistor R34 as applied to its base. The relative difference in these two voltages is amplified and applied through resistor R35 to the base of transistor Q17. The conductance of transistor Q17 is thus varied in accordance with the relative potentials applied to the emitter and base of transistor amplifier Q16. The level of conduction of transistor Q17 established by the input to its base controls the negative supply potential applied through its collector-emitter circuit to the common collector circuit of transistors Q14 and Q15.

Thus the negative supply potential applied to the common collector circuit of transistors Q14 and Q15 is governed by the potential drop across resistor R33. This, in turn, regulates the outputs appearing on the emitters of transistors Q14 and Q15 as applied to the bases of transistors Q12 and Q13. As a result, the conduction level of transistors Q12 and Q13 is correspondingly regulated so as to maintain the current drawn by the motor windings 130 and 132 constant.

As was previously noted, the multivibrator 52 of FIGURE 3 synchronizes or times the operation of the reversible flip-flop 56, which, in turn, controls the alternating energization of the stepping motor 16 to achieve incremental motor steps as seen in FIGURE 6; and also synchronizes the timing of the $\overline{B}$ gate issuing from the multivibrator 62, which controls the write circuitry of FIGURE 4 in recording a logical one on the magnetic tape. Accordingly, the generation of the $\overline{B}$ gate is properly timed phased with respect to each motor step so as to occur approximately at the instant of maximum tape velocity. Although this relative time phasing will vary with each particular type of stepping motor, in the disclosed embodiment, using the above described stepping motor, the magnetic tape 10 reaches its maximum velocity during each motor step approximately two milliseconds after the leading edge of the A pulse issuing from multivibrator 52, as set out in FIGURE 5. The motor characteristics of the preferred stepping motor 16 are such that a motor step takes approximately three and one-third milliseconds. Theoretically then, it takes three and one-third milliseconds for the tape 10 to start from rest position at the beginning of a tape step and again come to rest concluding the tape step.

For data rates of 250 to 300 characters per second, however, it has been found that consecutive tape steps interact. That is to say, the tape has not completely come to rest from the last tape step when the next motor strobe pulse arrives. This is particularly true of a data rate of 300 characters per second since strobe pulses are arriving every three and one-third milliseconds. It will be appreciated that if the tape is not completely at rest at the beginning of each tape step, the tape will achieve maximum velocity in less time than would otherwise be the case. Accordingly, the time phasing of the $\overline{B}$ gate which is maintained constant, will result in the $\overline{B}$ gate occurring after the tape has passed through its peak velocity and is slowing down to conclude the tape step. This will result in displacement of the recorded bits from their ideal positions on the tape. On playback, the similar displacement of the bits in time is called "jitter."

In order to remedy this problem, the multivibrator 52 of FIGURE 3 is constructed as shown in FIGURE 7*a*. The multivibrator 52 operates to selectively foreshorten or compress the $\overline{A}$ signal when the circuit is pulsed at high motor strobe pulse rates. With the $\overline{A}$ signal appropriately compressed, the B multivibrator 58 and hence the $\overline{B}$ multivibrator 62 is triggered sooner after the leading edge of the A signal, because the trailing $\overline{A}$ signal is foreshortened in time. Thus, the $\overline{B}$ gate is generated earlier in the tape step, so as to occur substantially at the time of maximum tape velocity.

Similarly, when reading a tape at high speeds the foreshortened $\overline{A}$ signal triggers GATE multivibrator 60 earlier causing the read gate to be generated earlier so that the bits will be read at the appropriate earlier time.

Considering FIGURE 7*a* in detail, positive motor strobe pulses at the input terminal 50 are applied through the series capacitor C1 and diode D1 (also shown in FIGURE 3) to the triggering input of the multivibrator 52. Multivibrator 52 comprises a pair of cross-coupled transistors Q20 and Q21. The emitters of each transistor are grounded while the collectors of transistors Q20 and Q21 are connected to a negative 12 volt supply through resistors R41 and R42, respectively.

The negative supply draws sufficient base current through a resistor R43 to maintain transistor Q20 normally conducting. Transistor Q21 is maintained normally nonconducting by a positive potential developed at the junction between resistors R44 and R45 which form a voltage divider connected between a plus 12 volt supply and the collector of transistor Q20. The collector of transistor Q21 is cross-coupled to the base of transistor Q20 over a path including a timing capacitor C23 connected in series with the parallel combination of a diode D15 and a variable resistor R46. A resistor R47 is connected between the collector of transistor Q20 and the junction between the capacitor C1 and diode D1 to provide a ground reference so as to enable passage of positive-going motor strobe pulses when the multivibrator 52 is in its quiescent or stable state ready to be triggered.

In operation, with the multivibrator 52 in its quiescent state, i.e., transistor Q20 conducting and transistor Q21 nonconducting, point *a* at the base of transistor Q20 is at approximately ground potential while point *c* at the collector of transistor Q21 is at a negative 12 volts and therefore, the timing capacitor C23 is charged to a potential of 12 volts. With the junction between the capacitor C1 and the diode D1 at ground potential, a positive motor strobe pulse at terminal 50 is passed to the base of transistor T20, driving it to cut-off.

As seen in FIGURE 7*b*, point *b* at the collector of transistor Q2 falls from ground potential to approximately negative 8 volts. This negative-going pulse coupled through resistor R44 to the base of transistor Q21 turns this normally nonconducting transistor on. Point *c* at the collector of transistor Q21 goes through a positive transition from a negative 12 volts to ground which is applied through the diode D15 and timing capacitor C23 to the base of transistor Q20 driving it well into cut-off.

The timing capacitor C21 begins discharging toward the negative supply potential through resistor R43 and the point *a* at the base of transistor Q20 falls exponentially toward a negative 12 volt level. As the point *a* goes slightly negative, transistor Q20 begins conducting and point *b* at its collector goes through a positive transition from negative 8 volts to ground. This positive transition coupled through resistor R44 to the base of transistor Q21 turns the latter off, causing a negative transition at its collector, point *c*. This positive-going transition at point *b* and negative-going transition at point *c* constitute the trailing edges of the outputs $\bar{A}$ and A, respectively. Accordingly, the durations of $\bar{A}$ and A signals are determined by the time duration during which transistor Q20 is nonconducting which is in turn determined by the discharging rate of timing capacitor C23.

At the instant when transistor Q20 again begins to conduct, it will be observed that points *a* and *c* are both at ground potential and therefore timing capacitor C23 is completely discharged. As the point *c* falls to a negative 12 volt level, the timing capacitor C23 begins charging through a charge path including the emitter-base circuit of transistor Q20, the variable resistor R46, and the resistor R42 to the negative 12 volt supply. It should be noted at this juncture that the diode D15 is forward biased during the discharging cycle of capacitor C23 but is blocking during the charging cycle to effectively insert the variable resistor R46 into this RC network, thus retarding the buildup of potential across the timing capacitor. As seen in FIGURE 7*b*, point *c* at the collector of transistor Q21 begins falling, from ground potential at the beginning of the charging cycle for capacitor C23, exponentially to the negative 12 volts at a rate determined by the charging time of the timing capacitor. If, however, a positive-going motor strobe pulse is applied to the input terminal 50 before the timing capacitor C23 is charged to the full 12 volts, the resulting cut-off of transistor Q20 and conduction of transistor Q21 gives rise to a positive-going transition at point *c* which will be less than 12 volts. This smaller transition, when coupled over the cross-coupling path to point *a*, will bring the base of transistor Q20 to a positive potential which is less than plus 12 volts.

Considering the specific example shown in FIGURE 7*b*, if the potential level at point *c* has only fallen to a negative 10 volts on the occurrence of the next motor strobe pulse, the potential at point *a* can only go to a plus 10 volts. Accordingly, the voltage across the capacitor is only 10 volts when it begins discharging. Since the discharge time constant for capacitor C23 remains constant, the time required for the potential at point *a* to fall exponentially to ground will be necessarily shorter. Since the transistor Q20 goes into conduction when point *a* passes through ground potential thereby terminating the pulse outputs $\bar{A}$ and A, the pulse duration of these pulse outputs is correspondingly shortened. With increasing motor strobe pulse repetition rates, the timing capacitor C23 is charged to a lesser voltage before it is discharged thereby decreasing the pulse duration of output signals $\bar{A}$ and A.

Since, as described above, the B multivibrator 62 is effectively triggered by the trailing edge of the $\bar{A}$ signal, indicated at 62*a* in FIGURE 7*a*, the phasing of the $\bar{B}$ gate with respect to a tape step is appropriately modified in order that the $\bar{B}$ gate occur substantially at the instant of maximum tape translation.

It will thus be seen that the multivibrator 52, shown in FIGURE 7*a* operates to selectively modifiy the duration of outputs A and $\bar{A}$ through the inclusion of the parallel combination of diode D15 and resistor R46. The resistance of resistor R46, is selectively variable to determine the degree of time compression of outputs A and $\bar{A}$. It operates to increase the time required for the multivibrator 52 to completely recover from the last motor strobe pulse. In the normal situation it is desired to make this recovery time as short as possible in order that the multivibrator outputs are uniform even in the event of high triggering rates. However, in the instant situation, the expanded recovery time provides for the desired compression of the multivibrator outputs A and $\bar{A}$ at high motor strobe pulse rates. The diode D15 operates to effectively remove the resistor R46 from the discharge circuit for capacitor C23 in order that this resistor will only be operative to modify the multivibrator outputs A and $\bar{A}$ when the motor strobe pulse rate exceeds a predetermined minimum as, for example, 250 steps per second.

*The buffer control circuit*

The use of two such magnetic tape recorder-reproducers, one operating in the write mode and the other operating in the read mode, in conjunction with a continuous magnetic tape to form a buffer storage system was discussed generally in connection with FIGURE 2. As described, the recorder or writer 30 and the reproducer unit or reader 32 have their operating functions controlled by a buffer control circuit 36 disclosed in detail in FIGURES 8 and 9. As was previously noted, the individual recorder-reproducers are capable of recording on or reading from a plurality of parallel tape channels or tracks simultaneously. For the purposes of the description to follow, the buffer control circuit 36 will be considered for the situation where six parallel channels of information are recorded on and read out from the tape 10. Moreover, the operation of the buffer control circuit 36 of FIGURES 8 and 9 will be considered for the particular application where the data requesting device or receiver 38 of FIGURE 2 is a teletypewriter which only accepts serial binary data bits in Baudot coded format consisting of a series of five character bits preceded by a start bit and immediately followed by a stop bit.

RECORDING

Referring to FIGURE 8 in the buffer control circuit 36, the input data derived from a data source such as the data transmitter 34 of FIGURE 2 is applied on a parallel bit basis to a bank of inverter circuits indicated generally at 140. As indicated, the individual input lines 37 carry character bits labelled D through H which in combined binary form represents a single teletype character in the Baudot coded format. The reason for the inclusion of the bank 140 of individual inverter circuits will be explained in the discussion of the operation of the portion of the buffer control circuit 36 shown in detail in FIGURE 9. Because of this inversion, an incoming logical one is recorded on the tape as a logical zero while an incoming logical zero is recorded as a logical one. The inverted character bits from the inverter circuits 140 are applied to the respective $s_1$ inputs of the steer gates 96 connected in the input circuitry of the respective storage flip-flops 92 included in each of the read-write circuits 18; each being identical in construction to the one disclosed in FIGURE 4. Steer gates 94 are permanently disabled.

Announcing the arrival of the character bits D through H, a clock pulse generated by the data source triggers a delay multivibrator 142 to develop complementary output pulses K and $\bar{K}$. The period of the delay multivibrator 142 is adjusted to provide 5 millisecond K and $\bar{K}$ signals. The end of this 5 millisecond period, the positive-going trailing edge of the $\bar{K}$ pulse is applied as the triggering input to all of the $t_1$ inputs of the steer gates 96 connected in the input circuitry of the plurality of storage flip-flops 92 (FIGURE 4). Thus, at the time of the $t_1$ input, which is 5 milliseconds after the occurrence of the clock pulse, those storage flip-flops 92 receiving an enabling $s_1$ input (those inputs D through H at ground potential), are triggered to the logical one state. It will be recalled that the flip-flops 92 had been reset to zero by the reset pulse *r* occurring at the completion of the previous recording cycle (FIGURE 3). By virtue of the inverter circuits 140, however, a logical one condition for the storage flip-flops 92 corresponds to a logical zero input character bit.

At the same time that the input character bits D through H are registered in the storage flip-flops 92, the storage flip-flops 92 associated with the sixth channel on the magnetic tape is triggered to the logical one state in preparation for recording an inverted start bit, herein labelled I, in the Baudot code format. To accomplish this, the I input line connected to the $s_1$ input of the flip-flop 92 registering the start bit is grounded and therefore permanently enabling. Thus on occurrence of the triggering pulse $t_1$, 5 milliseconds after the clock pulse, a logical one corresponding to the inverted start bit is stored in the I flip-flop 92 while the character bits D through H are stored in the remaining five flip-flops 92.

Accordingly, in order to condition the write circuitry in preparation for the actual recording operation, the input character bits D through H must be valid at the time of the occurrence of the triggering pulse $t_1$ supplied to all of the $t_1$ steer gate inputs (FIGURE 4).

The positive-going trailing edge of the $\overline{K}$ pulse from multivibrator 142 is also effective to trigger a second 5 millisecond delay multivibrator 144. The positive-going trailing edge of the resulting $\overline{L}$ signal from delay multivibrator 144 is differentiated by a capacitor C23 and a diode D15 for application as the motor strobe pulse S for triggering the A multivibrator 52 of FIGURE 3 into operation thereby initiating the recording cycle in conjunction with the stepping of the stepping motor 16.

As was discussed generally in connection with FIGURE 2, the buffer control circuit 36 includes provision for generating a leader of tape at such time when the loop of tape between the writer 30 and the reader 32 goes tight and a tight tape indication is generated. In practice, this situation occurs when data is being outputed at a faster rate than the rate at which data is being received for recording on the tape. It will be appreciated that when the tape does go tight, there is valid information characters recorded on the length of tape between the writer 30 and the reader 32. Any attempt to continue reading the tape during a tight tape condition would result in tape damage. However, it would be an intolerable situation if the reader 32 was unable to output data on request when there remains valid information characters recorded on the length of tape between the two storage units. It would not be practical to require the data receiver or teletypewriter 38 in the illustrated embodiment to wait for the writer 30, in response to the receipt of new information characters to build up a loop of tape between the two units. Without added provision, it would be impossible to ever completely empty the buffer of stored data.

According to the present invention, when the loop of tape 10 between the units 30 and 32 is lost and a tight tape indication is generated on line 41, the reader 32 is disabled and the writer 30 is enabled so as to generate a special length of tape or leader which is of sufficient length to permit the reader 32 to output all valid information characters stored on the tape spanning the two units. There is also provision for disabling the leader making operation at any time during its cycle on the occurrence of input data in order to permit the writer 30 to record the incident characters on the tape.

Still referring to FIGURE 8, the circuitry responsible for generating the tape leader is indicated generally at 146. The tight tape indication, abbreviated TT, developed through operation of a tension sensing, tape idler roller, as illustrated at 40 of FIGURE 2, and appearing on line 41, is inverted in an inverter circuit 150 and applied as $\overline{TT}$ to one input of an OR-INVERTER circuit 152. An OR-INVERTER circuit is precisely the combination of an OR gate and an inverter connected to complement or invert the output of the OR gate.

The positive-going leading edge of the output from the OR-INVERTER circuit 152 triggers a delay multivibrator 154 which is adjusted to provide a 33 millisecond delay. The positive-going trailing edge of the output signal from multivibrator 154 occurring at the end of this 33 millisecond delay period triggers a multivibrator 156 having a 5 second delay period.

The delay multivibrator 156 develops complementary output signals M and $\overline{M}$, each having a 5 second time duration. The M pulse is applied through an OR gate 158 to enable free running multivibrator 160 for 5 seconds. Free running multivibrator 160 is adjusted to produce a square wave output which closely approximates the maximum stepping rate of the recorder 30 (FIGURE 2). The output from multivibrator 160 is differentiated by a capacitor C24 and a diode D6 to provide 300 motor strobe pulses per second to the motor strobe line.

It will be noted that during the period that the astable multivibrator 160 is causing motor strobe pulses and in the absence of data clock pulses, delay multivibrator 142 is in its quiescent state and no triggering pulses $t_1$ are generated. As a result, the six write circuits associated with character bits D through I are each recording logical zeros in the parallel channels on the magnetic tape by virtue of the fact that the flip-flops 92 had been previously reset to zero on completion of the previous recording cycle (FIGURE 3). Thus the flip-flops 92 are automatically cleared in advance of each recording cycle. The recording of logical zeros in all channels, including that channel reserved for the inverted start bit I, corresponds to a special leader character which is recognizable by the logic circuitry of the buffer control circuit 36 of FIGURE 9 associated with the reader 32 of FIGURE 2. The tape leader generated during the 5 second period that the astable multivibrator 160 is enabled by the M signal from delay multivibrator 156, has a physical length slightly in excess of the distance between the writer 30 and the reader 32 as seen in FIGURE 2. Thus, there is sufficient tape length created between the two units 30 and 32 to permit the reader to output on request all valid information characters previously recorded on the tape before again experiencing a tight tape condition.

At the end of the 5 second period provided by the multivibrator 156, the positive-going trailing edge of the $\overline{M}$ signal triggers another delay multivibrator 162. The positive-going trailing edge of the output pulse from multivibrator 162, which is delayed 0.7 millisecond from the positive-going trailing edge of the $\overline{M}$ triggering signal, is applied to $t_1$ input to trigger a flip-flop 164 to its logical one state where FF is at ground level. The logical one output FF from flip-flop 164 is fed back and applied as an inhibiting input to the OR-INVERTER circuit 152 to prevent the needless generation of successive full lengths of tape leader.

The K output signal issuing from multivibrator 142 on occurrence of a clock pulse is also applied as an inhibiting input to the OR-INVERTER 152. Moreover, the K signal is applied through a diode D17 to the output circuit of delay multivibrator 154 and through a diode D18 to the $\overline{M}$ output circuit of multivibrator 156. The $\overline{K}$ output signal issuing from delay multivibrator 142 is used to disable the $s_1$ input to flip-flop 164 and, by its positive-going trailing edge, reset this flip-flop to its logical zero state. As will be seen from the description to follow, the multivibrator 142 operates to terminate the operation of the leader generating circuitry 146 when a clock pulse is received so as to give preference to the recording of a valid information character over the recording of a leader character.

The motor strobe pulses issuing from astable multivibrator 160 are also applied through OR gate 158 to its own input to provide self gating for each pulse cycle of its output so as to insure completion of each motor step and writing of each discrete leader character in spite of the termination of the M pulse.

In describing the operation of the leader generating circuitry 146 of FIGURE 8, it will be assumed initially that no information characters are coming in and therefore there is an absence of data clock pulses to trigger delay multivibrator 142. It will further be assumed that the last recording operation of the writer was in response to the receipt of valid information characters and, as a result, the flip-flop 164 was reset to zero by the last occurring $\overline{K}$ pulse issuing from delay multivibrator 142. Accordingly, the inhibiting inputs from flip-flop 164 and delay multivibrator 142 to the OR-INVERTER 152 are absent. Therefore, the only condition inhibiting an output from the OR-INVERTER circuit 152 is the absence of a tight tape indication TT on line 41. On the occurrence of a tight tape condition TT, line 41 goes positive. The tight tape indication TT is inverted in inverter 150 to a negative potential level, this removes the last inhibiting input to the OR-INVERTER circuit 152. The inclusion of the inverter 150 is solely for the purpose of providing consistent enabling potential levels, i.e., all negative, at the input to the OR-INVERTER circuit 152. The output from the OR-INVERTER circuit 152 immediately goes through a positive transition to trigger the delay multivibrator 154. After 33 milliseconds, the positive-going trailing edge of the output from delay multivibrator 154 triggers multivibrator 156. The positive-going M pulse issuing from delay multivibrator 156 is passed through the OR gate 158 to gate on the free running multivibrator 160 for its full 5 second duration.

At the end of the 5 second period, the positive-going trailing edge of the $\overline{M}$ pulse from the delay multivibrator 156 triggers the delay multivibrator 162. After a 0.7 millisecond delay, the positive-going trailing edge of the output from delay multivibrator 162 triggers the flip-flop 164 to the logical one state. During the 5 second M period that the astable multivibrator 160 was gated on, a tape leader of special leader characters having a physical length slightly in excess of the distance between the writer 30 and the reader 32, as seen in FIGURE 2, is generated. Thus, the magnetic tape 10 between the units after generation of a leader is slightly greater in tape length than twice the physical separation between the writer 30 and reader which is sufficient length to permit the leader to read out, at the request of the output device, all valid information characters recorded on the tape prior to the generation of the leader before encountering leader characters of the tape leader.

As will be seen upon consideration of the reader below, the logic circuitry of the buffer control circuit 36 seen in FIGURE 9 is designed to automatically step the tape each time a special leader character is recognized. Accordingly, once all the valid information characters are read out and a leader character is sensed, the tape is continually stepped through the reader until a tight tape condition is again indicated. Assuming no valid information characters have been recorded by the writer during this period, there is no advantage in again generating a tape leader since there is no valid information recorded on the tape spanning the two units.

In order to prevent the generation of two consecutive tape leaders, the logical one output from flip-flop 164 is fed back to the input of the OR-INVERTER circuit 152 to inhibit successive generations of tape leader.

On the next occurring clock pulse announcing the arrival of a valid information character, the resulting $\overline{K}$ signal from delay multivibrator 142 resets flip-flop 164 to the logical zero state while disabling the $s_1$ input to flip-flop 164. Coincidentally, the K signal from delay multivibrator 142 inhibits the OR-INVERTER 152 to prevent the initiation of a leader generating cycle. On termination of the 5 millisecond pulse K signal, initiation of a leader cycle is controlled by the condition of line 41. In practice, it may be found that a single tape step performed in the recording of a single valid information character will not be sufficient to eliminate the tight tape indication. In this event, the tight tape indication TT appearing on line 41 will again enable the OR-INVERTER circuit 152 and the resulting positive-going leading edge of the output from the OR-INVERTER circuit will trigger delay multivibrator 154 initiating a second leader generating cycle. If, for example, sufficient information is reported on the tape to remove the tight tape indication on line 41 the leader generating circuitry 146 remains quiescent.

It will be noted that each $\overline{K}$ signal from delay multivibrator 142 is effective to reset the flip-flop 164 to the logical zero state. At the same time, the K pulse functions to abort the operation of the leader generating circuitry 146 at any time during its cycle so as to give preference to the recording of valid information characters. Accordingly, the positive-going K signal applied through diode D17 terminates the operating cycle of delay multivibrator 154. This is readily accomplished by feeding the K pulse to the collector of the normally conducting transistor of the cross-coupled pair forming the conventional multivibrator 154. In similar fashion, the K pulse applied through diode D18 terminates the operating cycle of multivibrator 156.

Assuming the necessary conditions for enabling the OR-INVERTER circuit 152, the positive-going leading edge of the output from this circuit triggers the delay multivibrator 154 to begin a leader generating cycle. If during the next 33 milliseconds a valid information character is received, the accompanying clock pulse triggers delay multivibrator 142 and the resulting K signal immediately terminates the operating cycle of delay multivibrator 154. The positive-going trailing edge of the terminated output from delay multivibrator 154 will attempt to trigger multivibrator 156; however, this multivibrator is effectively disabled by the same K signal applied through diode D18. It is thus seen that the leader generating cycle is aborted prior to the actual recording of leader characters and the valid information is recorded on the magnetic tape in preference to the recording of leader characters.

The period of the delay multivibrator 154 is arbitrarily selected so as to prevent the generation of short segments of tape leader in the situation where the incoming data is at a relatively slow but steady rate. In the illustrated situation, if the data rate is faster than 33⅓ characters per second, special leader characters will not be recorded. However, if the period between characters is greater than 33 milliseconds, short segments of tape leader will be generated. Accordingly, the period of the delay multivibrator 154 is selected so as to prevent the interspersion of leader characters between valid characters arriving at acceptably slow character rates.

If however, the delay multivibrator 154 has gone through its 33 millisecond period without interruption by a clock pulse, the delay multivibrator 156 is triggered to initiate the 5 second tape leader period. The occurrence of a clock pulse at any time during this 5 second period will abort the leader generating cycle in a similar manner. The resulting K signal from delay multivibrator 142 as applied through diode D18 terminates the period of multivibrator 156, as described. On termination however, the positive-going trailing edge of the $\overline{M}$ signal is effective to trigger the delay multivibrator 162 and, 0.7 millisecond later, the $t_1$ input to flip-flop 164 is pulsed. Since the $\overline{K}$ signal has intervened to disable the $s_1$ input, flip-flop 164 is not triggered to the logical one state. The inclusion of the delay multivibrator 162 is necessary to allow the negative disabling $\overline{K}$ signal level to be fully established at the $s_1$ input of the flip-flop 164 before the arrival of a $t_1$ input from delay multivibrator 162, after the 0.7 millisecond delay. Since flip-flop 164 remains reset, a leader generating cycle can be initiated when tight tape is again indicated. It is thus seen that the inhibiting function of flip-flop 164 is effective only on the completion of a leader generating cycle.

At this point it should be noted that the delay multivibrator 142 also provides a 5 millisecond period during which the write circuitry of FIGURE 4 can complete the recording of the last special leader character after a clock pulse has intervened to interrupt the operation of the leader generating circuitry 146 as described. At the end of this 5 millisecond delay period, the positive-going trailing edge of the $\overline{K}$ signal applied to the $t_1$ inputs is effective to register the newly arriving character bits D through H in the data flip-flops 92. The second delay multivibrator 144 provides an additional 5 milliseconds or a total of 10 milliseconds which provides more than ample time for the tape movement to completely come to rest. After interruption of the leader generating circuitry 146 before strobing the write motor to record the information character register in the data flip-flops 92.

READING

In the disclosed embodiment of the buffer storage system of FIGURES 8 and 9, the output requesting device or data receiver is a teletypewriter 38. This accepts only serial coded characters in the baudot code consisting of five consecutive character bits preceded by a start bit which is always a logical zero and followed by a stop bit which is always a logical one. Since the tape reader reads out the individual character bits D through H from the magnetic tape simultaneously and thus in parallel, it is necessary to arrange the character bits in serial for the teletypewriter 38. To achieve this, the individual flip-flop 92 of the reader 32 are each associated with one of the individual parallel channels of the magnetic tape and register the character bits D through H as well as the inverted start bit I, and are interconnected to form a shift register. The manner of this interconnection is shown in FIGURE 10. It will be understood that the flip-flops registering bits D through G (not shown in FIGURE 10) are interconnected between flip-flops H and I in the same manner as the flip-flops shown. As will be explained in the description to follow, the first stage of the shift register of FIGURE 9 comprises a flip-flop 170 for registering the inverted stop bit P while the last stage Q comprises a flip-flop 172 which furnishes the output to the teletypewriter 38. Both of these flip-flops 170 and 172 are components of the buffer control circuit of FIGURE 9.

Still referring to FIGURE 10, the flip-flops, collectively referred to as 92 and given the individual designations D through I corresponding to the six bits of each character in baudot code, are reset to zero by the pulse $r$ generated by the control circuit 22 of FIGURE 3 at the very beginning of the readout cycle. As will be recalled, the reset pulse $r$ is generated on the positive-going leading edge of the A pulse when the control circuit is in the read mode. Accordingly, all of the data flip-flops D through I are reset on the occurrence of each motor strobe pulse. On reading a logical one, the appropriate flip-flops 92 are set to the logical one state by the amplified readout signals appearing on the collectors of the corresponding output transistors Q10 of readout amplifier 122 shown in FIGURE 4. Accordingly, each flip-flop D through I stores the character bit D through I read out from the respective channels of the magnetic tape.

Interconnected in typical shift register fashion, the logical zero output of each flip-flop is connected to the $s_0$ input of the succeeding flip-flop. Similarly, the logical one output of each flip-flop is connected to the $s_1$ input of the succeeding flip-flop. When the $t_0$ and $t_1$ inputs are pulsed simultaneously, the bit stored in each stage is shifted to the next stage. Thus, the bits of a character may be shifted progressively to the right as seen in FIGURE 10.

Turning to FIGURE 9, each of the zero or $\overline{FF}$ outputs from the flip-flops 92 i.e., $\overline{D}$ through $\overline{I}$ are applied to an OR-INVERTER 174. Similarly, the ONE or FF outputs, D through I, from the data flip-flops 92 are applied to a second OR-INVERTER 176. The function of the OR-INVERTER 174 is to sense when no valid character is stored in the shift register of FIGURE 9. This being indicated by all one bits being stored in the data flip-flops. The OR-INVERTERS 176 function to sense when a leader character is stored in the flip-flops 92. This being indicated by all zero bits being stored in the data flip-flops. The outputs from the OR-INVERTERS 174 and 176, represented as $\overline{N}$ and O respectively, are applied to a third OR-INVERTER 178. The output from OR-INVERTER 178 becomes $N \cdot \overline{O}$. That is, the output from OR-INVERTER 178 is positive only if a message character is stored in the data flip-flops. This function is applied as one input to an OR-INVERTER 180 which has as its other input the tight tape indication TT appearing on line 41. The output from OR-INVERTER 180 then becomes $\overline{TT} \cdot (\overline{N}+O)$. That is, the output from OR-INVERTER 180 is positive only if there is no tight tape condition and no message character is stored in the data flip-flops. This function, when valid, is passed through an OR gate 182 to turn on an astable multivibrator 184.

The astable multivibrator 184 generates motor strobe pulses S which are applied to the input terminal 50 of the reader control circuit 22″ shown in FIGURE 3. The motor strobe pulses are also fed back through the OR gate 182 to provide self-gating for the astable multivibrator 184 so as to insure completion of each pulse cycle should the other conditions for gating on the astable multivibrator 184 end in midcycle.

A motor strobe pulse S issuing from astable multivibrator 184 is also used to reset the flip-flop 170 which is the first stage of the shift register shown on FIGURE 10. As is shown on both FIGURES 9 and 10, the logical zero output $\overline{P}$ from flip-flop 170 is applied to the $s_0$ input of the succeeding stage comprising flip-flop H while the logical one output P is applied to the $s_1$ input of flip-flop H. Additionally, the output $\overline{P}$ is applied as another input to the OR-INVERTER 174 while the output P is applied as an additional input to the OR-INVERTER 176.

Still referring to FIGURE 9, a character request input designated as R is applied as a ground potential level to an OR-INVERTER 186. This may consist of merely applying ground potential to this input through closure of a switch 188 as shown in FIGURE 8. The character request switch 188 may be mounted on the front panel of the buffer control unit or the character request input R may be generated by external logic associated with the teletype equipment. The second input to the OR-INVERTER 186 is connected to the output P from flip-flop 170. The output from OR-INVERTER 186 which becomes $\overline{R} \cdot \overline{P}$ is applied as one input to an OR-INVERTER 190. Thus, OR-INVERTER 190 receives a positive signal from the output of OR-INVERTER 186 when there is no character request, $\overline{R}$ and a zero bit stored in flip-flop P. The other inputs to the OR-CONVERTER 190 are the motor strobe pulse S, the output $\overline{N}$ from OR-INVERTER 174 and the output 0 from OR-INVERTER 176.

The output from the OR-INVERTER 190 thus becomes $\overline{S} \cdot N \cdot \overline{O} \cdot (R+P)$ which, when true, gates on an astable multivibrator 192 designated as the baud multivibrator. Thus, multivibrator 192 is gated when an information character has been read from the tape ($\overline{O}$) and simultaneously, the shift register contains at least one logical zero (N), and simultaneously, the motor strobe pulse has terminated ($\overline{S}$) and simultaneously, either (+) a character request (R) or the flip-flop 170 is in the logical one state (P). The output pulses from the baud multivibrator 192 pulse the $t_0$ and $t_1$ inputs of the flip-flops D through I, P and Q of the shift register of FIGURE 10 at the appropriate baud rate required by the teletypewriter 38. The flip-flop 172, as seen in both FIGURES 9 and 10, receives its $s_0$ and $s_1$ inputs from the flip-flop I in the next preceding stage of the shift register.

The logical zero or $\overline{Q}$ output from flip-flop 172 is applied through an inverter 194 to the teletypewriter 38. The output from the inverter 194 keys an on-off switch (not shown) to generate a serial array of on-off pulses according to the baudot coded format for application to the teletypewriter 38. The inverter 194 serves the purpose of inverting the coded bits to achieve their proper significance, since they were initially inverted by the inverters 140, as seen in FIGURE 8, prior to their recordation on the tape. The inverter further serves to isolate the flip-flop 172 from the switching transients occasioned in keying the on-off pulses forming baudot coded format. It will be appreciated, however, that the inversion could be automatically effected by using the logical one or Q output from the flip-flop 172 to key the teletypewriter 38 without having to employ an inverter; however, the attendant isolation feature would be lacking.

In considering the operation of the circuits of FIGURES 9 and 10, it will first be considered that the reader is engaged in reading valid information characters as contrasted to leader characters. The sequence of operation of the circuitry can best be appreciated by reference to the table of FIGURE 11 in conjunction with the description to follow. It will also be stated that the output $\overline{N}$ from the OR-INVERTER 174 is true for the situation where all of the flip-flops D through I and P are in the logical one state, i.e., inputs $\overline{H}$ through $\overline{I}$ and $\overline{P}$ are false. This condition occurs when a valid information character has been completely shifted out of the shift register as will be seen. $\overline{N}$ is false and therefore N is true for the condition where at least one of the same flip-flops is in the logical zero condition. On the other hand, the output 0 from the OR-INVERTER 176 is true if all of the inputs H through I and P are false. This would correspond to the situation where a leader character has been read from the tape and the flip-flops H through I are all in the logical zero state.

$\overline{O}$ is true, i.e., O is false, if at least one of the flip-flops D through I is in the logical one state. In the situation where a valid character is being read, there will always be at least one logical one stored in the flip-flops since the inverted start bit I is always a one. Whereas if a leader character is read, the inverted stop bit is a logical zero and therefore all flip-flops will contain a logical zero.

Assume for the present that the output from the OR-INVERTER 180 is true, that is, $\overline{TT}$ is true (loose tape) and either $\overline{N}$ or O are true (either leader character or an information character having been shifted from the shift register to the teletypewriter 38). The astable multivibrator 184 is gated on for a single pulse cycle to generate a motor strobe pulse S. The motor strobe pulse S initiates the read cycle and resets the flip-flops D through I and P to zero. Substantially at the moment of maximum tape velocity, the recorded character bits D through I are read from the tape and stored in the corresponding flip-flops D through I. This situation is indicated in the second row opposite "read" of FIGURE 11 wherein the P flip-flop 170 registers a logical zero, the flip-flops D through H register the corresponding data bits either logical one or zero, read from the tape as indicated by $\phi_D$ through $\phi_H$ and the I flip-flop registers a logical one which is the inverted start bit. The Q flip-flop 172 is in the logical zero state. In this situation, both O and $\overline{N}$ are false, and therefore the output from OR-INVERTER 180 is false to inhibit further generations of motor strobe pulses S by astable multivibrator 184.

On the occurrence of a request character input R, the condition for shift out appearing at the output of OR-INVERTER 190 goes true since $\overline{S}$ is true (the strobe pulse has terminated), N is true (P flip-flop 170 always registers a logical zero at this point), O is true (flip-flops H through I store a message character) and R is true. The baud multivibrator 192 is gated on to provide triggering inputs $t_0$ and $t_1$ to each stage of the shift register of FIGURE 10.

As seen in FIGURES 9 and 10, the $s_1$ input to P flip-flop 170 is grounded and therefore permanently enabled, while the $s_0$ input is at minus 12 volts and thus permanently disabled. As a result, each trigger pulse from baud multivibrator 192 registers a logical one in the P flip-flop 170. Following the shifting steps from 1 through 7 tabulated in FIGURE 11, it is seen that on each triggering pulse, a logical 1 is written into P flip-flop 170 at its $t_1$ input, and the content of each stage is shifted one stage to the right as seen in FIGURE 10.

The astable multivibrator 184 is gated off during the entire shift-out process since the ouptut from the OR-INVERTER 180 remains false. This condition obtains since, at all times during the shift-out process, $\overline{N}$ is false, due to the fact that there is always one logical zero contained in the register. This results from the fact that the P flip-flop 170 was initially reset to zero by the motor strobe pulse S and this logical zero remains in the register until completely shifted out. In actuality, this logical zero corresponds to the inverted stop bit for the baudot code. In addition, O is false since there will always be a logical one in the shift register during the shift-out process due to the fact that we are continually writing ones in the P flip-flop 170 on each shift.

The shift-out process continues throughout its entire cycle of seven shifts without interruption since $\overline{S}$ remains true, N is true ($\overline{N}$ is false), $\overline{O}$ is true (O is false), and P remains true (P flip-flop 170 continually registers a logical one during shift-out). It is thus seen that the shift-out process, once initiated, is independent of the character request input R and thus its completion is insured.

As seen in FIGURE 11, after shift No. 7 all of the character bits are shifted out of the shift register and every flip-flop of the register with the exception of the Q flip-flop 172 contains a logical one. Since the state of the Q flip-flop 172 is not sensed in OR-INVERTERS 174 and 176, $\overline{N}$ goes true indicating that the shift register has been emptied. The output from the OR-INVERTER 190 goes false (N is false) and the astable multivibrator 192 is gated off. At the same time however, assuming loose tape, the output from the OR-INVERTER 180 goes true, and the multivibrator 184 is gated on to repeat the read cycle and shift-out process in sequence. It will be noted that valid character bits D through I read from the tape are held in the shift register of FIGURE 9 until a request character input R is generated. Thus, an information character remains stored in the shift register until such time as there is a request for data and only at that time is the shift register emptied.

Now considering the situation where a leader character is sensed, it will be seen that with the flip-flops D through I and P all containing logical zeros, O is true and, by the same token, the output from the OR-INVERTER 180 is true, assuming loose tape. The multivibrator 184 is gated on to generate a single motor strobe pulse S. Since O is true, $\overline{O}$ must be false, the output from the OR INVERTER 190 is false and the content of the shift register is not shifted out to the teletypewriter. Thus a leader character stored in the shift register precipitates another motor strobe pulse and consequent stepping of the tape to read the next character on the tape; however, a leader character is never outputted to the teletypewriter. Accordingly on reading a tape leader, O remains true and the reader continues to step the tape whether there is a character request input or not. Once a valid character is read and stored in the shift register, further motor strobe pulses are inhibited and the shift register awaits a request character input R at which time the data content of the shift register is shifted out to the teletypewriter. Of course, if $\overline{TT}$ goes false to indicate tight tape, the multivibrator 184 is gated off until the tight tape condition is remedied by the generation of a tape leader as described in connection with FIGURE 8.

In the situation where a tape leader has been generated by the leader generating circuitry 146 of FIGURE 8 to remedy a tight tape condition, the reader will continue to read, on request, the characters recorded on the tape prior to the tape leader. Once a leader character is read however, the buffer control circuit of FIGURE 8 and specifically the output from the OR-INVERTER circuit 180 will gate on the astable multivibrator 184 to generate a motor strobe pulse S. As long as a leader character is read, regardless of whether or not a character request input R is present, motor strobe pulses S are repetitively generated and the tape is scanned at a rate of from 160 to 300 characters per second as determined by the pulse rate of astable multivibrator 184. Assuming that the leader generating circuitry 146 has previously gone through a complete leader making cycle without interruption by intervening clock pulse, the flip-flop 164 resides in its logical one state to inhibit the OR-INVERTER 152 of FIGURE 7. Accordingly, the reader will scan the tape leader until disabled by a tight tape condition. The buffer control circuit 36 of FIGURES 8 and 9 then operate to disable both the reader and the writer until at least one valid character is recorded on the tape by the writer. It will be seen that the reader continuously scans the tape at a fast rate in search of a valid character whether in a request character mode or not. This fast scan is stopped only when a valid character is read from the tape and registered in the shift register or a tight tape condition is encountered.

It will be recalled that the input character bits are inverted by the bank of inverter circuits 140 of FIGURE 8 prior to their recordation on the tape. On read-out, the data bits are reinverted by the inverter 194 prior to application to the teletypewriter 38. This technique is resorted to in order to achieve greater system reliability. The reason behind this is the fact that the system is required to write and read the special leader characters at a faster rate than the valid data characters. The advantage of processing the special leader characters in as short a time as possible so as to leave more time for the processing of valid characters is readily appreciated.

Since the special leader character must be readily distinguishable from any valid information character and since the start bit I serving to announce the arrival of a valid information character is a logical zero in the baudot coded format, it becomes necessary to write the special leader character with all logical ones. It has been found, however, that the system is more likely to drop a logical one than a logical zero when operating at high speed. Thus, by inverting each data character bit as well as the start bit I, which then becomes a logical one, the special leader character can be written as all logical zeros to clearly distinguish from any valid data character and also achieve the added reliability incident in processing logical zeros at high speeds.

Where, as in the disclosed embodiment, the data receiver is a teletypewriter, the presence of a start bit is absolutely essential for correct interpretation of each information character. This situation exists since the teletypewriter is designed to "FRAME" on each start bit. That is to say, the teletypewriter waits until it receives a logical zero which it interprets as a start bit and then accepts the next five digital bits as information bits corresponding to a teletype character. The succession of five character bits is followed by a logical one bit which the teletypewriter interprets as a stop bit. It will be recalled that the stop bit, rather than being recorded on the tape, is created by the buffer control circuit 36 of FIGURE 9 by always resetting the flip-flop 170 to the logical zero state with the motor strobe pulse S from the astable multivibrator 184. This logical zero is then shifted through the shift register immediately following the five information character bits and inverted by the inverter 194 to become the logical one stop bit.

Since, however, it is contemplated to record the inverted start bit I on the magnetic tape 10 which then operates as a "flag" to provide ready distinction between a valid data character and a leader character, there is always the possibility, though remote, that the inverted start bit will be dropped during read-out. The loss of the inverted start bit or any recorded logical one bit may occur because of a faulty spot on the tape, read-write circuit malfunction, or due to noise on the transmission lines between the data transmitter and the writer 30 (FIGURE 2). If this were to occur, the stop bit, by virtue of the inverter 194, will be transmitted to the teletypewriter 38 as a logical one. However, the teletypewriter will not frame on this start bit but will wait for receipt of a logical zero, which will, in all probability, be a character bit. Obviously, if the teletypewriter interprets the succeeding five digital bits as character bits, an erroneous teletype character will be printed out.

In order to materially overcome the possibility of misframing, a negative voltage transition at the output of OR-INVERTER 176 occurring when O goes false are applied over line 196 to an inverter 198 as seen in FIGURE 9. The output from the inverter 198 becomes a positive pulse which is used to trigger the inverted stop bit flip-flop I to the logical one condition when any of the inputs D through I to the OR-INVERTER is true indicating a logical one. As a result, the inverted start bit is recreated in the I flip-flop on each and every occasion where at least one of the inputs D through I to the OR-INVERTER 176 is true. In the situation where an inverter stop bit has been read from the tape and stored in the I flip-flop, the recreation of the inverted stop bit by a negative transition on line 196 is redundant. However, in the situation where the inverted stop bit is dropped but one of the other inputs D through H to the OR-INVERTER 176 is a logical one, the resulting negative transition on the output of the OR-INVERTER 176 appearing on line 196 recreates the inverted start bit in the I flip-flop and misframing is avoided. The only situation where the drop-out of an inverted stop bit cannot be remedied is when all of the inputs D through H to the OR-INVERTER 176 are logical zeroes. It will be appreciated that the latter situation is impossible to remedy where, as in the disclosed embodiment, the inverted stop bit is the sole remaining distinction between a valid information character and a leader character.

It will be appreciated that rather than creating the stop bit internally in the buffer control circuit 36, it can be transmitted by the transmitter 34 and recorded on the tape by the writer 30. Similarly the start bit may also be transmitted along with the character bits for recording on the tape rather than being created in the buffer control circuit 36 as shown in FIGURE 8.

In the application where the data receiver is capable of accepting information characters on a parallel bit basis, the parallel to serial data conversion accomplished through interconnection of the flip-flops 92 as a shift register is unnecessary. The logic circuitry necessary to adapt the buffer store system to parallel readout is shown in FIGURE 12.

Referring to FIGURE 12, the outputs $\overline{D}$ through $\overline{H}$ from the individual data flip-flops 92 are sensed in an OR-INVERTER 200. Although only five parallel outputs are shown in FIGURE 12, it will be appreciated that the same principles are involved for a greater or lesser number of parallel outputs. The output from the OR-INVERTER 200, labelled U, is true if all of the inputs $\overline{D}$ through $\overline{H}$ are true, i.e., outputs D through H are false, to indicate that a leader character has been read from the tape. The output U from the OR-INVERTER 200 is inverted in an inverter circuit 202 and applied as one input to an OR-INVERTER 204. The other input to the OR-INVERTER 204 is the tight tape indication TT derived on line 41.

The output from the OR-INVERTER 204 becomes $U \cdot \overline{TT}$ (which is true when the data flip-flops store a leader character and there is no tight tape condition).

This gates on the astable multivibrator 184 (corresponding to the astable multivibrator 184 of FIGURE 9) to generate motor strobe pulses S which are passed through an OR-gate 206 to the terminal 50 of the control circuit of FIGURE 3. Thus, one condition for strobing the motor 16 and initiating a read cycle is the presence of a leader character U and loose tape $\overline{TT}$.

The second condition for generating motor strobe pulses is controlled by the data receiver 38. Accordingly, the output U from the OR-INVERTER 200 and a tight tape indication TT on line 41 are supplied as separate inputs to an OR-INVERTER 208. The output $\overline{TT}\cdot\overline{U}$ from the OR-INVERTER 208 is gated with a character request indication R transmitted from the receiver 38 in an AND gate 210. The output from the AND gate 210 becomes $\overline{TT}\cdot\overline{U}\cdot R$ which is true when this signal is used to gate on a clock generator 212 whose output is passed through the OR-gate 206 in the buffer control circuit for application as motor strobe pulses S to the reader to initiate a read cycle.

It is thus seen that the read motor is strobed and a read cycle is initiated by the buffer control circuit 36 when a leader character is read from the tape, i.e., U is true. Of course, if a tight tape condition is encountered, i.e., $\overline{TT}$ is false, generation of motor strobe pulses S by the buffer control circuit 36 is inhibited. On the other hand, in the situation where a valid information character is read from the tape and the data receiver 38 is requesting information characters (R is true), motor strobe pulses S are generated by the clock generator 212. Here again, the condition of tight tape serves to inhibit the generation of motor strobe pulses S.

Thus, the operation of the tape reader as controlled by the buffer control circuit 36 is essentially the same whether the information characters read from the tape are outputted to the data receiver 38 in serial bit or parallel bit fashion. Accordingly, in parallel bit operation, the tape reader continuously scans the tape in search of a message character and once a message character is read from the tape 10, the buffer control circuit 36 awaits a request character indication R from the receiver 38. The existence of an output from the AND gate 210 is used to advise the data receiver 38 when to look at the outputs D through H for a message character. It will be appreciated that since the message characters are being outputted to the data receiver in bit parallel, the circuitry of FIGURE 9 used to effect the serial shift-out of information character bits is no longer necessary.

*Summary*

The invention thus provides an asynchronous magnetic tape recorder-reproducer whose operating rate is dictated by the information rate of a data transmitter or data receiver. The recorder-reproducer is capable of processing binary coded characters at rates from zero to as high as 300 characters per second.

When in the recording mode, the recorder-reproducer responds to the receipt of a motor strobe pulse arriving coincidentally with each information character from the data transmitter to initiate a recording cycle.

As seen in FIGURE 3, the control circuit 22 operates in response to the motor strobe pulse to generate complementary motor control outputs. These outputs are fed to the motor control portion of the control circuit 22 shown in FIGURE 6. The motor control circuit operates in response to the complementary outputs from the control circuit to alternately energize motor field winding halves 130 and 132. The motor 16 is of the type such that alternate D.C. energization of its field winding in opposite directions precipitates uniformly incremental rotational stepping of the motor output shaft. The capacitor C20 aids the transfer of energizing current from one field winding half to the other by transferring the energy stored in one field winding half to the other. The motor output shaft drives a sprocket 14 which interengages the sprocket holes in the magnetic tape. Consequently, the magnetic tape 10 is translated past the array of magnetic heads 12 in discrete and uniform steps.

The control circuit 22 of FIGURE 3 also develops outputs for controlling the read-write circuitry of FIGURE 4 to appropriately control the energization of the magnetic heads 12 to record the binary information unit "bits" of each character on the magnetic tape according to a return to bias technique. Whether a logical one or a logical zero bit is recorded is determined by the state of an array of data flip-flops 92 (one being shown in FIGURE 4) conditioned by the input character bits received from the data transmitter 20. At the conclusion of each recording cycle the data flip-flops 92 are reset to zero by the control circuit 22 of FIGURE 3.

When the recorder-reproducer is operated in the read mode, the mode switch 70 connected in the control circuit 22 of FIGURE 3 is closed. A read cycle may then be initiated by the application of a motor strobe pulse to the control circuit 22. The stepping motor 16 is energized in the identical manner as in the recording mode. The array of data flip-flops 92 (one shown in FIGURE 4) are reset to zero upon the occurrence of each motor strobe pulse in preparation for reading digital information from the magnetic tape 10. As the magnetic tape is translated past the array of magnetic heads **12*a*–12*h* in discrete and uniform steps, magnetic flux reversals in the magnetization pattern recorded on the tape induce readout signals in the head windings of the individual magnetic heads. These readout signals are amplified in individual amplifying circuits 122 and applied to the flip-flop circuits 92. Since the flip-flops 92 are initially reset to logical zero, the absence of a readout signal leaves the corresponding flip-flop in the logical zero state while the presence of a readout signal triggers it to the logical one state. The control circuit 22 of FIGURE 3 only allows amplified readout signals to be stored in the flip-flop 92 during the short period of time when a logical one should be read from the magnetic tape. This prevents spurious signals from being stored in the flip-flops 92**.

As described, the control circuit 22 synchronizes the operation of the read-write circuit 18 of FIGURE 4 with each tape step so as to insure that the digital information bits are recorded in discrete and precisely located bit positions on the magnetic tape. These bit positions are located in reference to the sprocket holes in the magnetic tape 10 to insure proper registration between the discrete locations of the prerecorded digital information bits on the tape and the magnetic heads on readout. The control circuit 22 synchronizes the operation of the read-write circuit 18 so that the bit positions pass the magnetic head gaps precisely at the moment of maximum tape velocity in both the read and write modes. This insures maximum amplitude readout signals.

The multivibrator 52 in the control circuit 22 of FIGURE 3 provides upon each motor strobe pulse output signals A and $\overline{A}$ from which all of the other control signals are timed. At rapid stepping rates where the tape does not come to a complete stop after each tape step before the next step, the multivibrator (shown in detail in FIGURE 7) selectively compresses the duration of the A and $\overline{A}$ signals to take into account the fact that the tape will reach its maximum velocity sooner and the bits must consequently be recorded and read sooner to maintain their precise positions on the tape.

The asynchronous magnetic tape recorder-reproducer of FIGURE 1*a* is ideally suited for use in the novel magnetic tape buffer storage system of the invention. As shown in FIGURE 2, a pair of such magnetic recorder-reproducers are arranged to operate in tandem, one as a recorder 30 and the other as a reproducer 32 with a continuous sprocketed magnetic tape 10. The respective operations of the recorder and the reproducer are controlled by a buffer control circuit 36 shown in FIGURES 8 and 9. The main function of the buffer control circuit 36 with regard to the magnetic tape recorder is to initiate the generation of a tape leader each time the tape between the recorder and the reproducer goes tight. This condition arises when the reproducer is reading the magnetic tape at a faster rate than the recorder is recording digital information on the tape.

In the event of a tight tape condition and in the absence of input information characters to be recorded, the leader generating circuitry 146 included in the portion of the buffer control circuit 36 shown in FIGURE 8 generates motor strobe pulses to successively step the magnetic tape past the recording heads and, coincidentally therewith, record on the tape a special leader character which is readily distinguishable from any valid information character. In the continued absence of input digital information characters, the leader generating circuitry 146 is designed to generate a tape leader having a physical length which is slightly in excess of the distance between the recorder 30 and the reproducer 32. It thus becomes possible for the reproducer to then continue to read the tape and output all of the previously recorded valid message characters; in other words, to completely empty the buffer store of recorded message characters before again encountering tight tape.

The leader generating circuitry 146 also includes a memory device in the form of flip-flop 164 which prevents the needless generation of two consecutive tape leaders without any intervening message characters having been recorded on the tape. Moreover, the leader generating the circuitry 146 and particularly, the OR inverter 152, the delay multivibrator 154 and the multivibrator 156 can be disabled by the arrival of a message character at any time during a leader generating cycle. This insures that the recording of a message character gains preference over the recording of a leader character.

Once a character is recorded on the tape, whether a message character or a leader character, it is read from the tape by the reproducer 32 under the control of the portion of the buffer control circuit shown in FIGURE 9 or FIGURE 12 and the data receiver. Since in FIGURE 9, the data receiver 38 is shown to be a teletypewriter the information characters read from the tape must be delivered to the teletypewriter in serial bit fashion. In FIGURE 12 on the other hand, the disclosed embodiment of that portion of the buffer control circuit is adapted to the situation where the information characters are delivered to the data receivers 38 on a parallel bit basis.

First summarizing the situation where the information characters are read out on a serial bit basis, the OR-INVERTER 176 in FIGURE 9 distinguishes between a message character and a leader character as read from the tape by the reproducer. The inputs to the OR-INVERTER 176 are derived from the individual data flip-flops 92, one of which is shown incorporated in the read-write circuit of FIGURE 4. In order to achieve parallel to serial bit conversion, the individual flip-flops 92 are interconnected to form a shift register. Thus, the character bits are read from the tape in parallel and shifted serially from the shift register to the teletypewriter 38 under the control of the buffer control circuit 36 of FIGURE 9.

The OR-INVERTER 174 of FIGURE 9 receives inputs from each of the flip-flops 92 and operates to sense the condition where a message character has been completely shifted from the shift register of FIGURE 10 and delivered to the teletypewriter 38. When either a leader character is read out or a message character is shifted out, as indicated by the outputs from OR-INVERTERS 174 and 176, the astable multivibrator 184 is gated on to generate a motor strobe pulse to initiate another read operation. In order to prevent damage to the tape, the generation of motor strobe pulses to the reproducer stepping motor is disabled any time a tight tape condition is encountered.

Accordingly, the reproducer 32 continues to scan or read the magnetic tape as long as leader characters are read, but since leader characters are not valid information, they are not outputted to the teletypewriter 38. Once a message character is stored in the shift register subsequent generation of motor strobe pulses are temporarily disabled. The buffer control circuit 36 as well as the reproducer stand waiting for a character request signal. In response to such a signal the astable multivibrator 192 is gated on to generate triggering pulses for shifting the character bits serially through the shift register chain and thus to the teletypewriter 38.

As seen in FIGURE 12, the operation of the reproducer and the buffer control circuit for simultaneous (parallel) output of the bits of each character is essentially the same except that the parallel to serial bit conversion afforded by the shift register of FIGURE 10 is no longer necessary. Accordingly, that portion of the buffer control circuit 36 of FIGURE 9 concerned with serial shift-out becomes superfluous. As before, the OR-INVERTER 200 of FIGURE 12 receives inputs from the individual flip-flops 92 so as to determine whether a leader character or a valid information character is stored in the array of data flip-flops 92. As long as the output from the OR-INVERTER 200 is true, indicating the presence of a leader character, the astable multivibrator 184 is gated on to generate motor strobe pulses to continue scanning the tape. Once a valid information character is read out an dstored in the data flip-flops 92, the astable multivibrator 184 is gated off.

The buffer control system thus stands waiting for the receiver 38 to request information characters. Once a character request information is generated in the receiver 38, the clock generator 212 is gated on to generate motor strobe pulses as long as message characters are being read from the tape. The generation of motor strobe pulses by either the multivibrator 184 or the clock generator 212 is inhibited in the event a tight tape condition is encountered. The output from the AND gate 210, which is used to gate on the clock generator 212, is also used to tell the receiver when to look at the outputs from the various flip-flops 92 for valid information characters.

It will thus be seen that the objects set forth above, among those made apparent from the preceding description, are efficiently attained and, since certain changes may be made in the disclosed system and apparatus set forth without departing from the scope of the invention, it is intended that all matter contained in the above description or shown in the accompanying drawings shall be interpreted as illustrative and not in a limiting sense. It is to be understood, for example, that while the preferred embodiment utilizes solid state circuitry, tube circuitry may be employed. The specific timing relationships disclosed for the operating functions may vary widely depending on the specific application. Moreover, the logic circuitry may differ from that specifically disclosed and yet achieve the desired control functions. Although the return to bias magnetic recording technique is preferred, the invention can be readily adapted for other recording techniques. In addition, rather than a single center tapped field winding, motors having plural field windings can be used to provide incremental stepping translation of the magnetic tape.

Furthermore, although a magnetic storage media is disclosed, it is contemplated that the teachings of the present invention can be applied with advantage to other electronic processable storage media. The invention contemplates the utilization of any incremental driving means capable of providing predetermined incremental stepping translation of the storage medium on command of external equipment. The input device or transmitter and the output device or receiver, with which the invention is incorporated, may take many and different forms applicable to both serial and parallel information transmission.

It is also to be understood that the following claims are intended to cover all of the generic and specific features of the invention which, as a matter of language, might be said to fall therebetween, and to cover any system or apparatus employing means providing the claimed functions for similar purposes.

Particularly, it is to be understood that in said claims, elements, signals or functions recited to the singular are intended to include compatible combinations of equivalent elements, signals or functions wherever the sense permits.

Having described the invention, what is claimed as new and desire to secure by Letters Patent is:

1. A buffer store system comprising, in combination:
   (A) a data transmitter randomly transmitting information characters in parallel bit fashion,
   (B) a data receiver randomly requesting information characters;
   (C) a sprocketed magnetic tape having a series of precisely located and uniformly spaced bit positions arranged transversely and extending lengthwise thereof;
   (D) an asynchronous magnetic tape recorder, comprising
      (1) electromagnetic transducing means extending transversely of said magnetic tape,
      (2) intermittently actuated means for translating said tape in discrete and uniform lengthwise steps to present successive transverse arrays of bit positions to said transducing means,
      (3) a write circuit electrically connected to said transducing means for selectively energizing said transducing means so as to record in parallel bit fashion on said magnetic tape the information characters received from said data transmitter, and
      (4) a control circuit for conditioning said write circuit to operate in the record mode and for actuating said translating means in response to the receipt of an information character from said transmitter;
   (E) an asynchronous magnetic tape reproducer positioned from said magnetic tape recorder in the direction of tape translation, said reproducer comprising
      (1) electromagnetic transducing means extending transversely of said magnetic tape and operating to read information characters recorded by said recorder,
      (2) intermittently actuated means for translating said tape in discrete and uniform steps to present successive transverse arrays of bit positions to said transducing means,
      (3) a read circuit electrically connected to said transducing means for processing information characters read from said tape by said transducing means, and
      (4) a control circuit for conditioning said read circuit to operate in the read mode and for actuating said translating means in response to an information character request; and,
   (F) a buffer control circuit operating to signal said recorder control circuit to initiate a recording cycle on receipt of each information character from said data transmitter and to signal said reproducer control circuit to initiate a read cycle on receipt of a request from said data receiver for information characters, said buffer control circuit comprising
      (1) means responding to a condition of tight tape between said recorder and reproducer to initiate a succession of recording cycles by said recorder so as to generate a leader of said tape having a length at least equal to the physical distance between said recorder and reproducer
         (a) said leader having recorded thereon leader characters which are distinctive from information characters, and
      (2) means for outputting only information characters to said data receiver.

2. The system defined in claim 1 wherein said means responsive to a tight tape condition comprises:
   (a) a pulse generator for repetitively strobing said recorder control circuit to initiate successive recording cycles in which leader characters are recorded on said magnetic tape,
   (b) an enabling circuit for gating on said pulse generator for a complete leader cycle so as to generate a tape leader having a length slightly in excess of the distance between said recorder and said reproducer, and
   (c) a first gating means responsive to a tight tape indication for developing an output effective to trigger said enabling circuit.

3. The apparatus defined in claim 2 wherein
   (1) said reproducer includes a shift register accepting information characters read from said tape on a parallel bit basis and controlled by said buffer control circuit to output said information characters to said data receiver on a serial bit basis,
   (2) said data receiver includes a teletypewriter and each said information character is preceded by a start bit recorded on said tape and stored in said shift register
   (3) said buffer control circuit further includes
      (a) a strobe pulse generator for actuating said reproducer to perform a read operation,
      (b) a shift pulse generator for repetitively shifting information character bits serially from said shift register,
      (c) a second gating means for repetitively energizing said strobe pulse generator as long as leader characters are stored in said shift register,
      (d) a third gating means for energizing said strobe pulse generator after an information character has been shifted serially from said shift register,
      (e) a fourth gating means responsive to said second and third gating means and a character request indication for energizing said shift pulse generator to shift said shift register only when an information character is stored in said shift register,
      (f) means for inhibiting the operation of said strobe pulse generator when a tight tape indication is generated, and
      (g) means responsive to said second gating means when a valid information character is stored in said shift register to recreate said start bit in said shift register.

4. The system defined in claim 2 wherein said means responsive to a tight tape indication further comprises:
   (d) a bistable circuit operating in response to the conclusion of a complete leader generating cycle to inhibit said gating means and prevent the successive generation of complete leader cycles, and
   (e) delay circuit means operating in response to the receipt of an information character to
      (i) inhibit said first gating means,
      (ii) disable said enabling circuit and
      (iii) condition said bistable circuit so as to remove its inhibition on said gating means.

5. The system defined in claim 4 wherein said means responsive to a tight tape indication further comprises:
   (f) a delay circuit for delaying the output from said gating means.

6. A buffer storage system comprising, in combination:
(A) a data transmitter randomly transmitting information characters in digital bit parallel;
(B) a data receiver randomly requesting information characters on a bit parallel basis;
(C) a sprocketed magnetic tape having a series of precisely located and uniformly spaced bit positions arranged transversely and lengthwise thereof;
(D) an asynchronous magnetic tape recorder, said recorder comprising:
(1) an electromagnetic transducing means extending transversely of said magnetic tape,
(2) intermittently actuated means for translating said tape in discrete and uniform lengthwise steps to present successive transverse arrays of bit positions to said transducing mean,
(3) a write circuit electrically connected to said transducing means for selectively energizing said transducing means so as to record, in said bit positions on said magnetic tape, the information characters received from said data transmitter, and
(4) a control circuit for conditioning said write circuit to operate in the record mode and for actuating said translating means in response to the receipt of an information character from said transmitter;
(E) an asynchronous magnetic tape reproducer positioned from said magnetic tape recorder in the direction of tape translation, said reproducer comprising
(1) electromagnetic transducing means extending transversely of said magnetic tape and operating to read information characters recorded by said recorder,
(2) intermittently actuated means for translating said tape in discrete and uniform steps to present successive transverse arrays of bit positions to said transducing means,
(3) a read circuit electrically connected to said transducing means for processing information characters read from said bit positions on said tape by said transducing means, and
(4) a control circuit for conditioning said read circuit means to operate in the read mode and for actuating said translating means in response to said character request from said data receiver; and
(F) a buffer control circuit operating to signal said recorder control circuit to initiate a recording cycle on receipt of each information character from said data transmitter and to signal said reproducer control circuit to initiate a read cycle on receipt of a request from said data receiver for information characters, said buffer control circuit comprising
(1) means responsive to a condition of tight tape between said recorder and reproducer to initiate a succession of recording cycles by the recorder so as to generate a leader of said tape having a length slightly in excess of the physical distance between said recorder and reproducer,
(a) said leader having recorded thereon leader characters which are distinctive from information characters,
(2) a first gating means responsive to the digital characters read from said tape by said reproducer,
(3) a pulse generator responsive to said first gating means when a leader character is read from said tape to generate a strobe pulse for initiating the next read cycle, and
(4) second gating means responsive to said first gating means when an information character is read from said tape and a simultaneous character request input to initiate the generation of a strobe pulse to initiate a read cycle.

7. The system defined in claim 6 wherein said buffer control circuit further includes
(5) means for disabling the generation of strobe pulses pulses when the magnetic tape between said recorder and said reproducer goes tight.

8. A buffer storage system for use in combination with a data transmitter randomly transmitting digital information characters, a data receiver randomly requesting digital information characters, a continuous magnetic tape, and said buffer storage system comprising, in combination:
(A) a recorder for recording digital information characters received from said transmitter, said recorder comprising
(1) means translating said tape through a discrete and uniform record step while recording each digital information character;
(B) a reproducer spaced from said recorder in the direction of tape translation for reading digital information characters recorded on said tape by said recorder for output to said data receiver, said reproducer comprising
(1) means translating said tape through a discrete and uniform read step while reading each digital information character, and
(2) storage means for temporarily storing a digital information character read from said tape; and,
(C) a buffer control circuit including
(1) first means controlling said recorder to initiate record steps while recording a succession of digital leader characters on said tape when the said tape between said recorder and reproducer goes tight,
(2) second means controlling said reproducer to automatically initiate read steps as long as digital leader characters are read from said tape and discontinuing read steps when a digital information character is read from said tape and stored in said storage means, and
(3) third circuit means responsive to the concurrence of a digital information character being stored in said storage means and a request character indication originating from said receiver for initiating a read step.

9. The system defined in claim 8 wherein said buffer control circuit further comprises:
(4) disabling means for disabling said first means on the receipt of a valid information character so as to prefer the recording of information characters to the recording of leader characters on said tape.

10. The system defined in claim 9 wherein said storage means are adapted as a data processing circuit for accepting information characters read from said tape on a parallel bit basis and are adapted to furnish said information characters to said data receiver under the control of said buffer control circuit on a serial bit basis, said buffer control circuit further comprising:
(5) means for emptying said storage means in serial bit fashion and
(6) means operating when said storage means is emptied to initiate a read step.

References Cited

UNITED STATES PATENTS

| | | | |
|---|---|---|---|
| 3,155,778 | 11/1964 | Meyer | 179—100.2 |
| 3,289,189 | 11/1966 | Clark et al. | 346—74 |

BERNARD KONICK, *Primary Examiner.*

A. I. NEUSTADT, *Assistant Examiner.*

UNITED STATES PATENT OFFICE
CERTIFICATE OF CORRECTION

Patent No. 3,357,002 December 5, 1967

William Reid Smith-Vaniz et al.

It is hereby certified that error appears in the above numbered patent requiring correction and that the said Letters Patent should read as corrected below.

Column 4, line 16, after "parallel" insert -- bit --. Column 7, line 16, "milliseconds" should read -- millisecond --. Column 9, line 66, cancel "the OR gate 100 is connected to the output Y of the OR"; line 69, after "of" insert -- the OR gate 100 is connected to the output Y of the OR --. Column 10, line 47, "$\overline{R}$" should read -- $\overline{B}$ --. Column 26, line 51, "CONVERTER" should read -- INVERTER --. Column 34, line 31, "an dstored" should read -- and stored --. Column 35, line 9, "to" should read -- in --. Column 37, line 16, "mean" should read -- means --.

Signed and sealed this 14th day of October 1969.

(SEAL)
Attest:

EDWARD M.FLETCHER,JR.
Attesting Officer

WILLIAM E. SCHUYLER, JR.
Commissioner of Patents